United States Patent
Seo et al.

(10) Patent No.: US 10,299,235 B2
(45) Date of Patent: May 21, 2019

(54) METHOD FOR PERFORMING COMMUNICATION BETWEEN DEVICES IN WIRELESS COMMUNICATION SYSTEM AND DEVICE FOR PERFORMING SAME

(71) Applicant: LG ELECTRONICS INC., Seoul (KR)

(72) Inventors: Inkwon Seo, Seoul (KR); Hanbyul Seo, Seoul (KR); Kijun Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 15/502,935

(22) PCT Filed: Sep. 4, 2015

(86) PCT No.: PCT/KR2015/009337
§ 371 (c)(1),
(2) Date: Feb. 9, 2017

(87) PCT Pub. No.: WO2016/036182
PCT Pub. Date: Mar. 10, 2016

(65) Prior Publication Data
US 2017/0230926 A1 Aug. 10, 2017

Related U.S. Application Data

(60) Provisional application No. 62/076,490, filed on Nov. 7, 2014, provisional application No. 62/074,574, filed (Continued)

(51) Int. Cl.
*H04W 56/00* (2009.01)
*H04J 11/00* (2006.01)

(52) U.S. Cl.
CPC ......... *H04W 56/0015* (2013.01); *H04J 11/00* (2013.01); *H04J 11/0073* (2013.01);
(Continued)

(58) Field of Classification Search
None
See application file for complete search history.

(56) References Cited

U.S. PATENT DOCUMENTS

2003/0069037 A1* 4/2003 Kiyomoto ............. H04W 60/04
455/552.1
2014/0301285 A1* 10/2014 Ahn ....................... H04W 48/12
370/329
(Continued)

FOREIGN PATENT DOCUMENTS

RU          2 503 153 C2    12/2013
WO      WO 2014/088338 A1   6/2014
WO      WO 2014/098522 A1   6/2014

OTHER PUBLICATIONS

CATT, "Discussion on D2D Synchonization Sources," 3GPP TSG RAN WG1 Meeting #78, R1-142894, Dresden, Germany, Aug. 18-22, 2014, 4 pages.
(Continued)

*Primary Examiner* — Phirin Sam
*Assistant Examiner* — Faiyazkhan Ghafoerkhan
(74) *Attorney, Agent, or Firm* — Birch, Stewart, Kolasch & Birch, LLP

(57) ABSTRACT

A method for performing a device-to-device (D2D) communication in a wireless communication system by a terminal, according to an embodiment of the present invention, comprises: a step for detecting a D2D synchronization signal from at least one synchronization source; a step of measuring a D2D reference signal received through the same subframe as that for the detected D2D synchronization signal; and a step of selecting synchronization reference UE
(Continued)

from said at least one synchronization source according to whether a prescribed condition is satisfied, wherein said prescribed condition is satisfied if the measured result of the D2D reference signal satisfies a threshold value and an information element of a D2D channel linked with the D2D reference signal satisfying the threshold value is acquired.

15 Claims, 12 Drawing Sheets

Related U.S. Application Data on Nov. 3, 2014, provisional application No. 62/046,176, filed on Sep. 5, 2014.

(52) U.S. Cl.
CPC ....... *H04J 11/0076* (2013.01); *H04J 11/0079* (2013.01); *H04W 56/00* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/23* (2018.01)

(56) References Cited

U.S. PATENT DOCUMENTS

| | | | | |
|---|---|---|---|---|
| 2015/0181546 | A1* | 6/2015 | Freda | H04W 56/0015 370/336 |
| 2015/0215883 | A1* | 7/2015 | Zheng | H04W 52/30 455/426.1 |
| 2015/0215903 | A1* | 7/2015 | Zhao | H04W 72/04 370/329 |
| 2015/0245193 | A1* | 8/2015 | Xiong | H04W 4/80 370/328 |
| 2015/0264588 | A1* | 9/2015 | Li | H04W 56/0015 370/350 |
| 2015/0319724 | A1* | 11/2015 | Chae | H04W 8/005 370/315 |
| 2015/0351059 | A1* | 12/2015 | Seo | H04W 56/002 370/350 |
| 2016/0014812 | A1* | 1/2016 | Park | H04L 5/0048 370/329 |
| 2016/0044618 | A1* | 2/2016 | Sheng | H04W 56/002 370/329 |
| 2016/0050667 | A1* | 2/2016 | Papasakellariou | H04W 74/0808 370/329 |
| 2016/0135240 | A1* | 5/2016 | Yoon | H04W 76/14 370/329 |
| 2016/0212721 | A1* | 7/2016 | Sheng | H04W 76/14 |
| 2016/0227496 | A1* | 8/2016 | Panteleev | H04W 76/18 |
| 2017/0013578 | A1* | 1/2017 | Wei | H04W 8/005 |
| 2017/0142741 | A1* | 5/2017 | Kaur | H04W 56/002 |
| 2017/0230923 | A1* | 8/2017 | Huang | H04W 56/00 |
| 2017/0230926 | A1* | 8/2017 | Seo | H04J 11/0073 |

OTHER PUBLICATIONS

LG Electronics, "Discussion on D2D Synchronization Procedure," 3GPP TSG RAN WG1 Meeting #76, R1-140330, Prague, Czech Republic, Feb. 10-14, 2014, pages.

LG Electronics, "On the Design of D2DSS and PD2DSCH," 3GPP TSG RAN WG1 Meeting #76, R1-140329, Prague, Czech, Feb. 10-14, 2014, pp. 1-6.

ZTE, "D2D Synchronization Signal and Channel Design," 3GPP TSG-RAN WG1 #78, R1-143142, Dresden, Germany, Aug. 18-22, 2014, pp. 1-6.

ZTE, "Synchronization Design for D2D Broadcast Communication," 3GPP TSG-RAN WG1 #76, R1-140269, Prague, Czech Republic, Feb. 10-14, 2014, pp. 1-11.

Alcatel-Lucent Shanghai Bell et al., "D2D Synchronization Procedure," 3GPP TSG RAN WG1 Meeting #77, R1-142062, Seoul, Korea, May 19-23, 2014 (May 10, 2014), 2014, pp. 1-5 (5 pages total).

Fujitsu, "Discussion on D2D Synchronization Procedure," 3GPP TSG RAN WG1 Meeting #78, R1-142935, Dresden, Germany, Aug. 18-22, 2014 (EPO Server date Aug. 17, 2017), pp. 1-5, XP050788417.

Institute for Information Industry (III), "Performance of D2D Synchronization Source Selection and D2DSS Transmission," 3GPP TSG-RAN WG1 Meeting #76bis, R1-141498, Shenzhen, China, Mar. 31-Apr. 4, 2014 (EPO Server date Mar. 30, 2014), 5 pages, XP050787167.

Intel Corporation, "Synchronization Procedure for D2D Communication," 3GPP TSG RAN WG1 Meeting #77, R1-142022, Seoul, Korea, May 19-23, 2014 (May 10, 2014), pp. 1-5.

ITL Inc., "Considerations on D2D Synchronization Signal Design," 3GPP TSG RAN WG1 Meeting #77, R1-142530, Seoul, Korea, May 19-23, 2014, pp. 1-5.

LG Electronics, "Discussion on Design of D2DSS and PD2DSCH," 3GPP TSG RAN WG1 Meeting #76bis, R1-141357, Shenzhen, China, Mar. 31-Apr. 4, 2014, pp. 1-4.

LG Electronics, "Discussion on UE Procedures for D2DSS Transmission and Reception," 3GPP TSG RAN WG1 Meeting #78, R1-143192, Dresden, Germany, Aug. 18-22, 2014 (Aug. 17, 2014), pp. 1-3, XP050788669.

\* cited by examiner (a)

(b)

(a)

(b)

METHOD FOR PERFORMING COMMUNICATION BETWEEN DEVICES IN WIRELESS COMMUNICATION SYSTEM AND DEVICE FOR PERFORMING SAME

CROSS REFERENCE TO RELATED APPLICATIONS

This application is the National Phase of PCT/KR2015/009337 filed on Sep. 4, 2015, which claims priority under 35 U.S.C. § 119(e) to U.S. Provisional Application Nos. 62/046,176 filed on Sep. 5, 2014; 62/074,574 filed on Nov. 3, 2014; and 62/076,490 filed on Nov. 7, 2014, all of which are hereby expressly incorporated by reference into the present application.

TECHNICAL FIELD

The present invention relates to a wireless communication system and, more particularly, to a method of receiving or transmitting a signal at user equipments (UEs) supporting device-to-device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention is to provide a method of, at a user equipment (UE) supporting device-to-device (D2D) communication, selecting an appropriate synchronization reference for a wireless communication environment thereof and performing D2D communication based on the selected result.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method of performing device-to-device (D2D) communication by a user equipment (UE) in a wireless communication system includes detecting a D2D synchronization signal from at least one synchronization source, measuring a D2D reference signal received through a same subframe in which the D2D synchronization signal is detected, and selecting a synchronization reference UE from the at least one synchronization source depending on whether a predetermined condition is satisfied, wherein the predetermined condition is satisfied when a result of measuring the D2D reference signal satisfies a threshold and an information element of a D2D channel associated with the D2D reference signal satisfying the threshold is acquired.

In another aspect of the present invention, a user equipment (UE) for performing device-to-device (D2D) communication includes a receiver configured to receive a D2D synchronization signal from at least one synchronization source, and a processor configured to measure a D2D reference signal received through a same subframe in which the D2D synchronization signal is received and to select a synchronization reference UE from the at least one synchronization source depending on whether a predetermined condition is satisfied, wherein the predetermined condition is satisfied when a result of measuring the D2D reference signal satisfies a threshold and an information element of a D2D channel associated with the D2D reference signal satisfying the threshold is acquired.

The measuring the D2D reference signal may include measuring an average of received powers of resources, on which a D2D demodulation reference signal (DMRS) for demodulation of the D2D channel is transmitted.

The UE may transmit at least one of a D2D synchronization signal of the UE and an information element of a D2D channel of the UE, at least part of the D2D synchronization signal of the UE being configured the same as the D2D synchronization signal received from the synchronization reference UE, and at least part of the information element of the D2D channel of the UE being configured the same as the information element of the D2D channel received from the synchronization reference UE.

When the predetermined condition is not satisfied and the synchronization reference UE is not selected, the UE may perform D2D communication at timing of the UE itself and, when the predetermined condition is satisfied and the synchronization reference UE is selected, the UE may perform D2D communication based on timing of the selected synchronization reference UE.

The UE may transmit a D2D synchronization signal of the UE itself based on pre-configuration of a base station, when the predetermined condition is not satisfied, the synchronization reference UE is not selected and the UE is out of coverage.

The UE may perform D2D communication based on signaling from a base station if the UE is changed from out-of-coverage to in-coverage.

The UE may detect a sequence of a primary D2D synchronization signal (PD2DSS) which is repeatedly mapped to at least two symbols based on one of a plurality of root indices for a Zadoff-Chu sequence.

A first root index of the plurality of root indices may correspond to in-coverage and a second root index of the plurality of root indices may correspond to out-of-coverage.

The information element of the D2D channel may include a bandwidth for D2D communication through the D2D channel, a D2D frame number, a D2D subframe number and uplink (UL)-downlink (DL) configuration information in a case of time division duplex (TDD).

Advantageous Effects

According to one embodiment of the present invention, in selection of a synchronization reference UE, a D2D UE considers received power of a reference signal received through the same subframe as a synchronization signal and also considers a D2D channel demodulated through the reference signal, thereby accurately and efficiently selecting a synchronization reference suitable for a wireless channel environment thereof and performing D2D communication according to selection of the synchronization reference.

The effects which can be obtained by the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
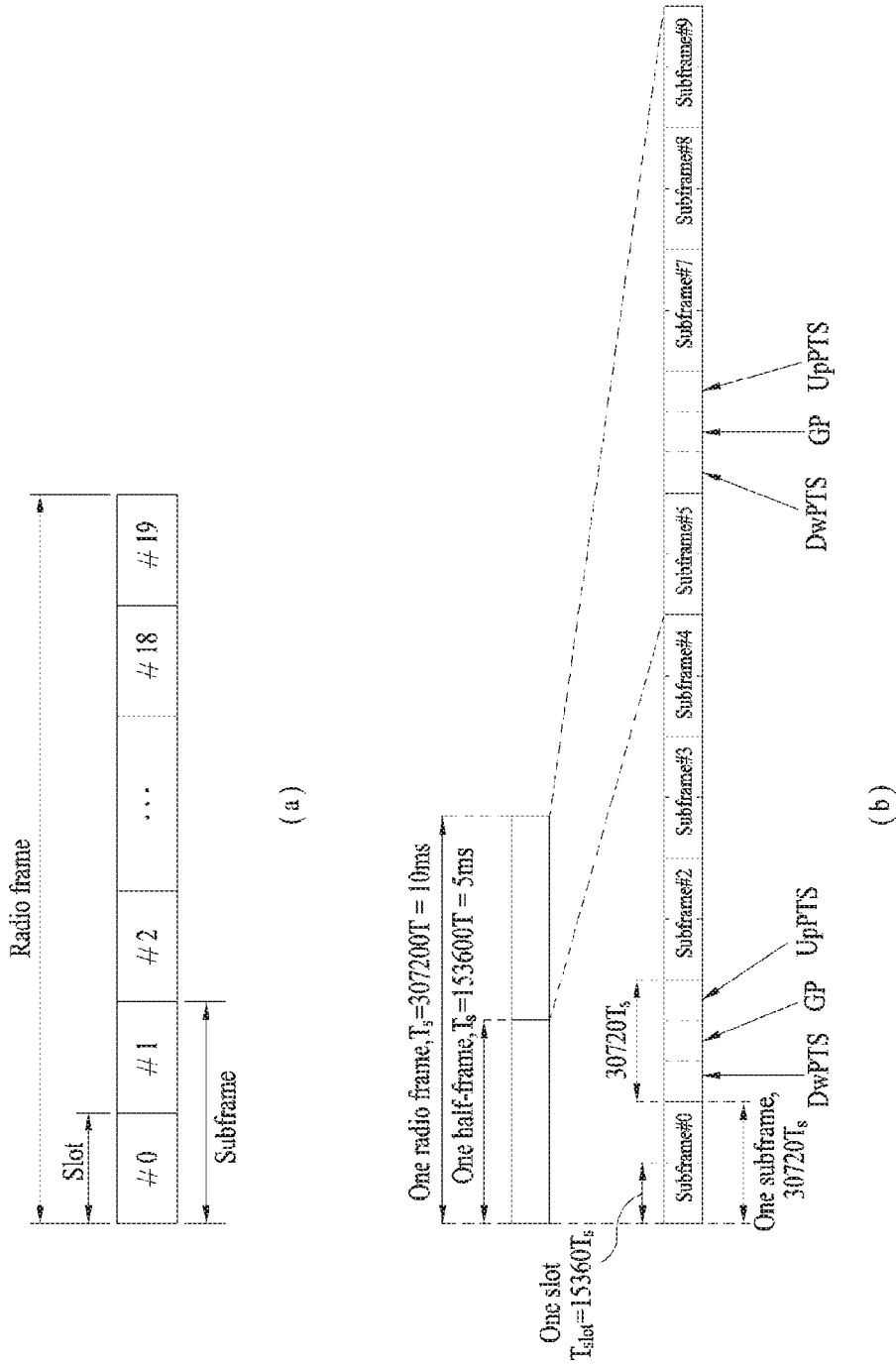
FIG. 1 is a diagram showing the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(*a*) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(*b*) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
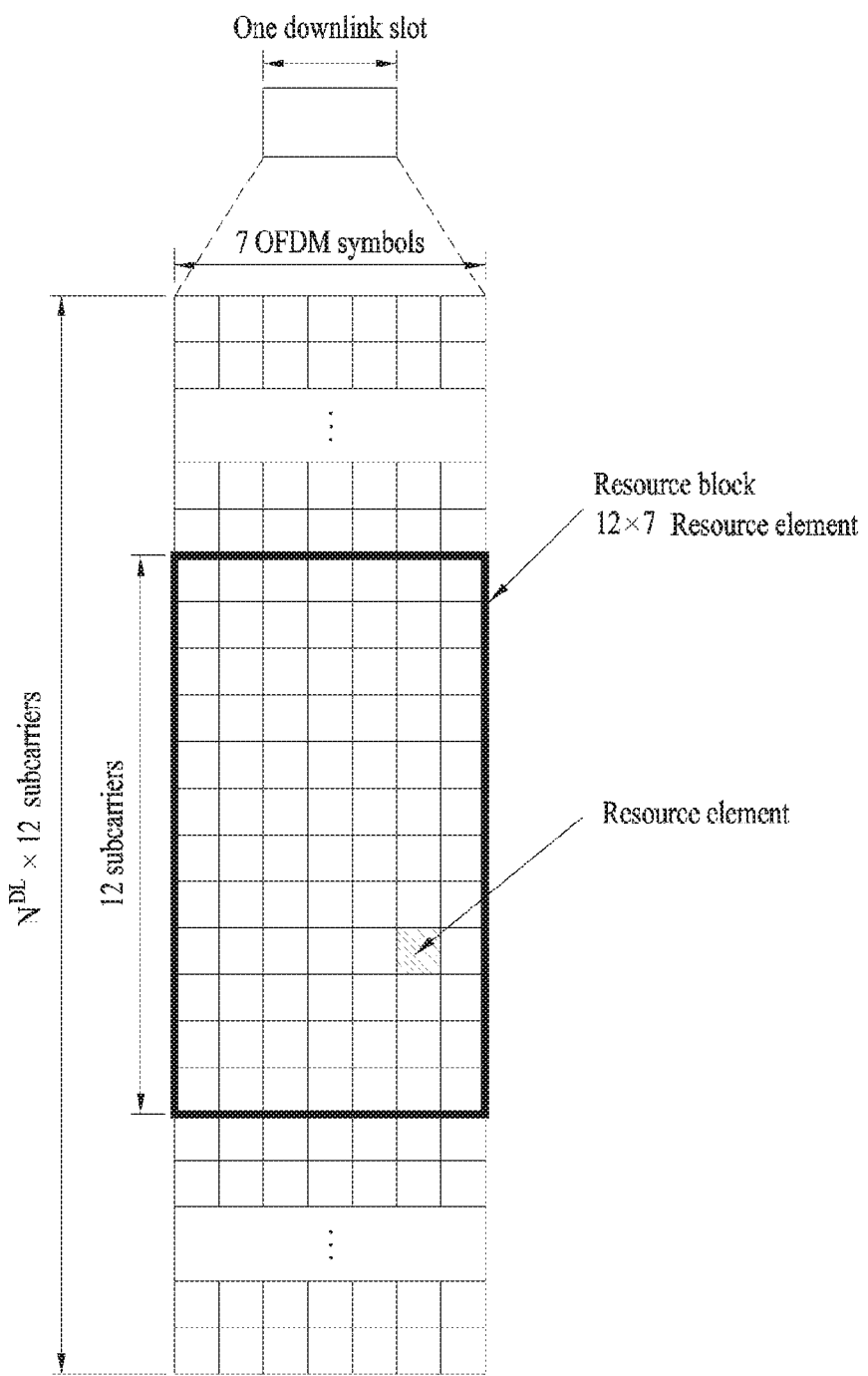
FIG. 2 is a diagram showing a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
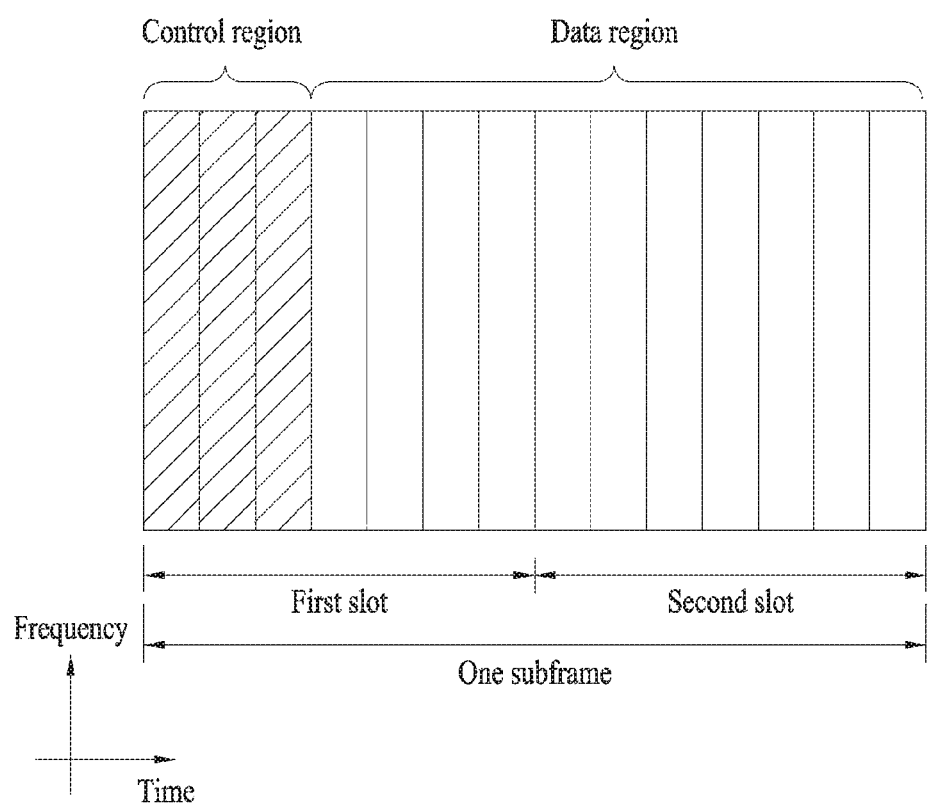
FIG. 3 is a diagram showing the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI).

If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
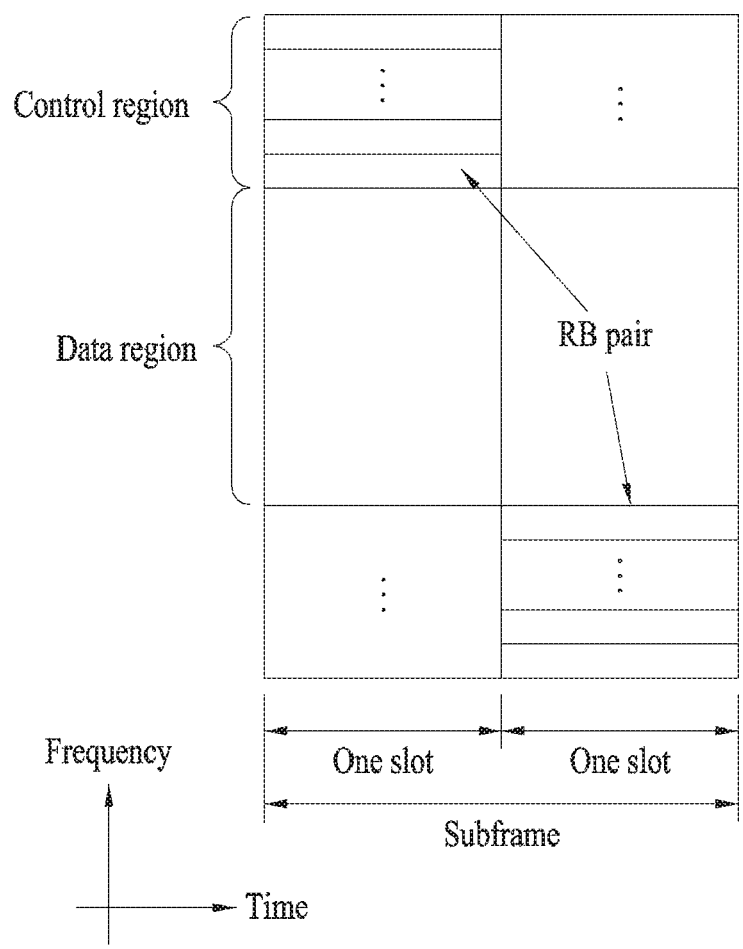
FIG. 4 is a diagram showing the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
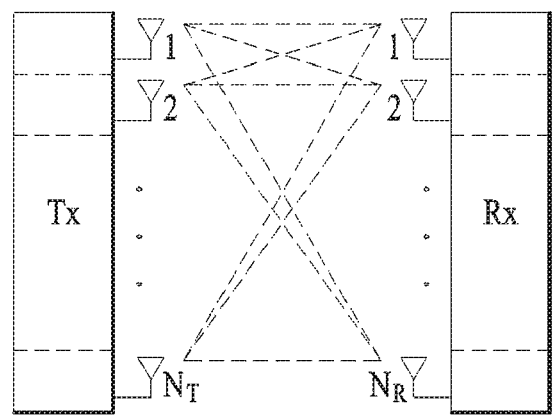
FIG. 5 is a diagram showing the configuration of a wireless communication system having multiple antennas.
Figure 5:
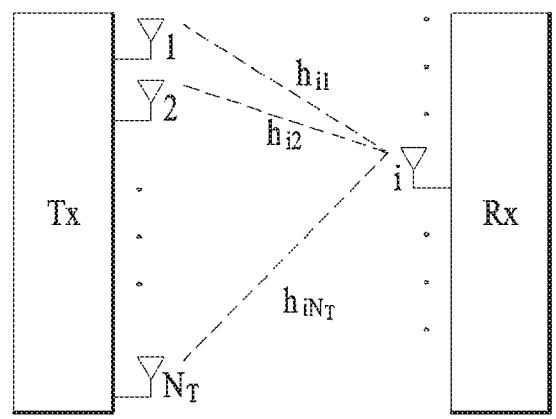

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T$$ [Equation 6]

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}]$$ [Equation 7]

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}$$ [Equation 8]

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this description, "rank" for MIMO transmission refers to the number of paths capable of independently transmitting a signal at a specific time and using specific frequency resources and the "number of layers" refers to the number of signal streams transmitted through each path. In general, since a transmission end transmits layers corresponding in number to the number of ranks used for signal transmission, the rank has the same meaning as the number of layers unless stated otherwise.

PSS (Primary Synchronous Signal)/SSS (Secondary Synchronous Signal)

Figure 6:
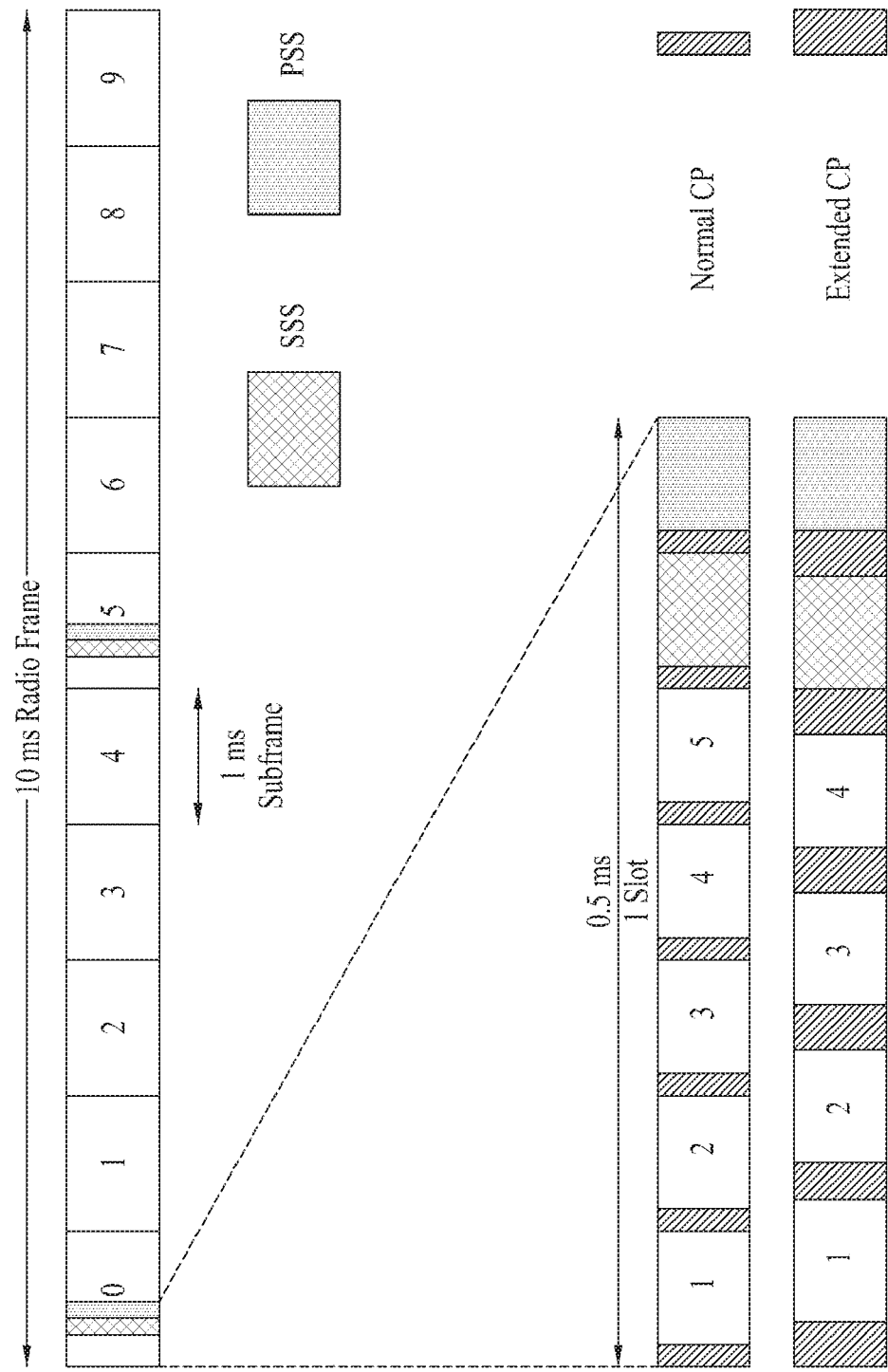
FIG. 6 is a diagram showing a PSS and an SSS of a 3GPP system.

FIG. 6 is a diagram for explaining a PSS and an SSS corresponding to synchronization signals used for a cell search in LTE/LTE-A system. Before the PSS and the SSS are explained, a cell search is explained. When a user equipment initially accesses a cell, the cell search is performed for a case of performing a handover from the currently accessed cell to a different cell, a case of reselecting a cell or the like. The cell search may include acquisition of frequency and symbol synchronization for a cell, acquisition of downlink frame synchronization for a cell and determination of a cell identifier (ID). One cell group consists of three cell identifiers and there may exist 168 cell groups.

An eNB transmits a PSS and an SSS to perform a cell search. A user equipments obtains 5 ms timing of a cell by detecting the PSS and may be able to know a cell identifier included in a cell group. And, the user equipment is able to know radio frame timing and a cell group by detecting the SSS.

Referring to FIG. 6, a PSS is transmitted in a $0^{th}$ and a $5^{th}$ subframe. More specifically, the PSS is transmitted on the last ODFM symbol of a first slot of the $0^{th}$ subframe and the last OFDM symbol of a first slot of the $5^{th}$ subframe, respectively. And, the SSS is transmitted on the last but one OFDM symbol of the first slot of the $0^{th}$ subframe and the last but one OFDM symbol of the first slot of the $5^{th}$ subframe, respectively. In particular, the SSS is transmitted on an OFDM symbol right before an OFDM symbol on which the PSS is transmitted. The aforementioned transmission timing corresponds to a FDD case. In case of TDD, the PSS is transmitted on a third symbol of the $1^{st}$ subframe and a third symbol of a $6^{th}$ subframe (i.e., DwPTS) and the SSS is transmitted on the last symbol of a $0^{th}$ subframe and the last symbol of a $5^{th}$ subframe. In particular, the SSS is transmitted on a symbol preceding as many as 3 symbols of a symbol on which the PSS is transmitted in the TDD.

The PSS corresponds to a Zadoff-Chu sequence of a length of 63. The PSS is actually transmitted on 73 center subcarriers (72 subcarriers except a DC subcarrier, i.e., 6 RBs) of a system frequency bandwidth in a manner that 0 is padding to both ends of the sequence. The SSS consists of a sequence of a length of 62 in a manner that two sequences each of which has a length of 31 are frequency-interleaved. Similar to the PSS, the SSS is transmitted on the center 72 subcarriers of the whole system bandwidth.

PBCH (Physical Broadcast Channel)

Figure 7:
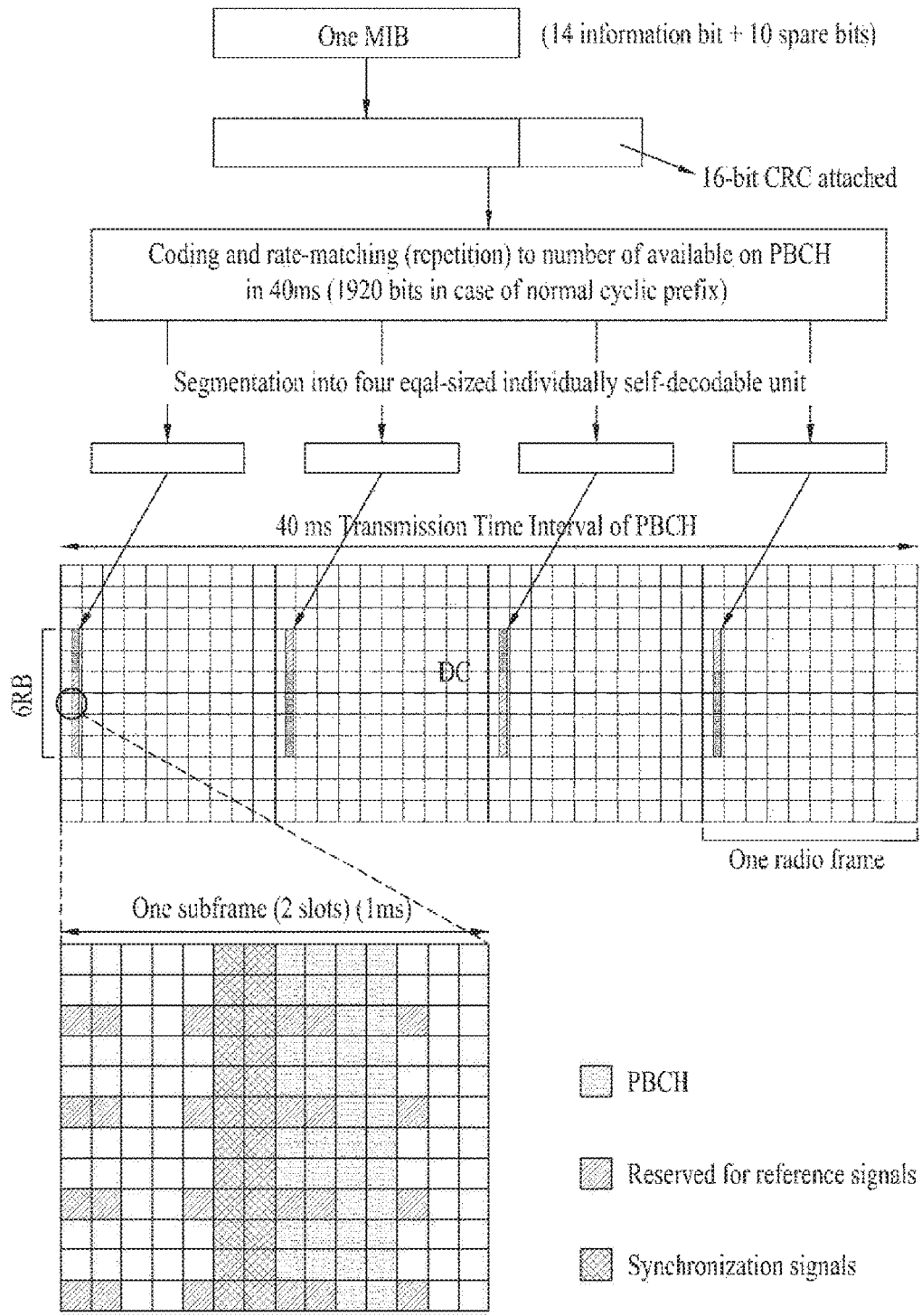
FIG. 7 is a diagram showing a PBCH of a 3GPP system.

FIG. 7 is a diagram for explaining PBCH. The PBCH corresponds to a channel on which system information corresponding to a master information block (MIB) is transmitted. The PBCH is used to obtain system information after a user equipment obtains synchronization and a cell identifier via the aforementioned PSS/SSS. In this case, downlink cell bandwidth information, PHICH configuration information, a subframe number (a system frame number (SFN)) and the like can be included in the MIB.

As shown in FIG. 7, one MIB transport block is transmitted via a first subframe in each of 4 consecutive radio frames. More specifically, PBCH is transmitted on first 4 OFDM symbols of a second slot of a 0th subframe in the 4 consecutive radio frames. Hence, the PBCH configured to transmit a MIB is transmitted with an interval of 40 ms. The PBCH is transmitted on center 72 subcarriers of a whole bandwidth in frequency axis. The center 72 subcarriers correspond to 6 RBs corresponding to a smallest downlink bandwidth. This is intended to make a user equipment decode BCH without any problem although the user equipment does not know a size of the whole system bandwidth.

Initial Access

Figure 8:
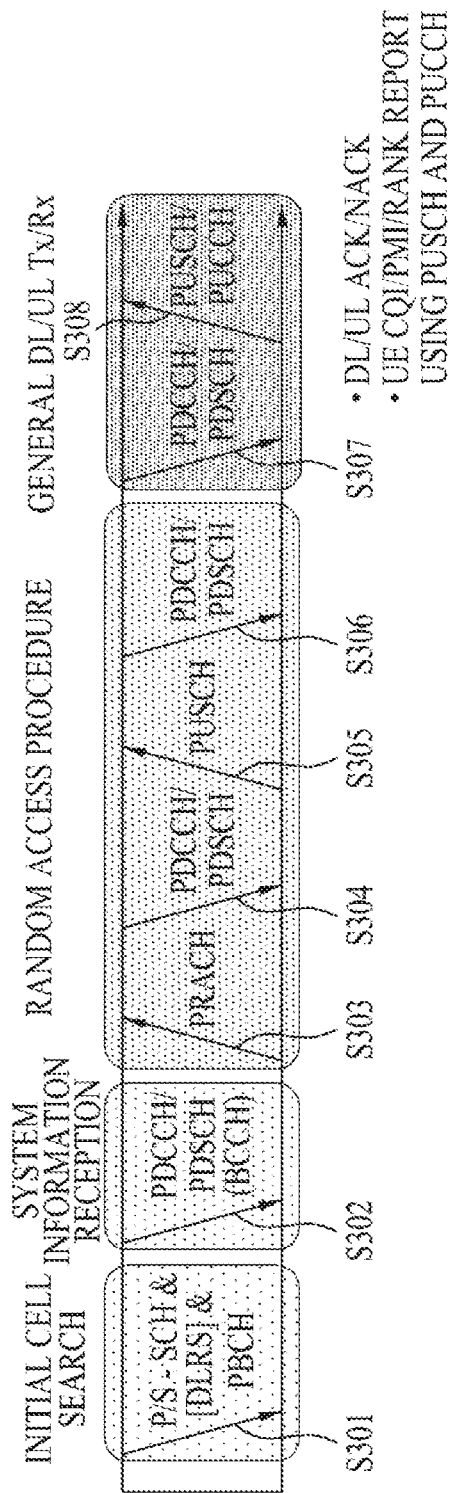
FIG. 8 is a diagram illustrating an initial access procedure of a 3GPP system and a signal transmission and reception method.

FIG. 8 is a diagram illustrating an initial access procedure used in a 3GPP system and a signal transmission and reception method using physical channels.

When power is turned on or the UE enters a new cell, the UE performs an initial cell search procedure such as acquisition of synchronization with an eNB (S301). To this end, the UE may adjust synchronization with the eNB by receiving a PSS and an SSS from the eNB and acquire information such as a cell identity (ID). Thereafter, the UE may acquire broadcast information within the cell by receiving a physical broadcast channel (PBCH) from the eNB. In the initial cell search procedure, the UE may monitor a downlink (DL) channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (RACH) (S303 to S306) with respect to the eNB. To this end, the UE may transmit a specific sequence through a physical random access channel (PRACH) as a preamble (S303 and S305) and receive a response message to the preamble through the PDCCH and the PDSCH corresponding to the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

I. Synchronization Source of D2D UE

Hereinafter, synchronization acquisition between D2D UEs in D2D communication will be described based on the above description and the legacy LTE/LTE-A system. D2D may mean direct communication between UEs and the term D2D may be replaced with or used interchangeably with the term sidelink. The D2D UE means a UE supporting D2D. Hereinafter, the term UE may mean a D2D UE unless limited to a legacy UE.

In an OFDM system, if time/frequency synchronization is not acquired, multiplexing between different UEs may be impossible in an OFDM signal due to inter-cell interference and thus synchronization is necessary. However, for synchronization acquisition, it is not efficient for D2D UEs to individually transmit and receive synchronization signals such that all UEs individually acquire synchronization. Accordingly, in a distributed node system such as D2D, a specific node may transmit a reference synchronization signal and the remaining UEs may acquire synchronization. In other words, for D2D signal transmission and reception, some nodes may periodically transmit D2D synchronization signals (D2DSSs) and the remaining UEs may acquire synchronization and transmit and receive signals. A node for transmitting a D2DSS is referred to as a synchronization source. The synchronization source may become a synchronization reference of different D2D UEs.

The synchronization source may be, for example, an eNB or a D2D UE without being limited thereto. If the synchronization source is an eNB, a D2DSS transmitted by the eNB may include a legacy synchronization signal (e.g., Rel-8 PSS/SSS for eNB-to-UE communication).

A D2D UE in network coverage (hereinafter, referred to as "in_UE") may operate as a synchronization source if signaling is received from an eNB or if a predetermined condition is satisfied. A D2D UE located out of network coverage (hereinafter, referred to as "out_UE") may operate as a synchronization source if signaling is received from a header UE of a D2D UE cluster or if a predetermined condition is satisfied.

The synchronization source may have various operation types according to wireless environment. For better understanding, the type of the synchronization source is divided into ISS, DSS_1 and DSS_2 without being limited thereto.

ISS (Independent Synchronization Source)

An ISS may transmit a D2DSS, a physical D2D synchronization channel (PD2DSCH) and/or a DMRS of a PD2DSCH independently of synchronization timing of another synchronization source. The PD2DSCH is a D2D broadcast channel transmitted through the same subframe as the D2DSS and details of an information element transmitted through the PD2DSCH will be described below. Since an in_UE generally synchronizes with an eNB, the ISS may be regarded as an out_UE. A UE operating as a synchronization source may mean that the UE operates as an ISS if there is no special description (e.g., operation as a DSS).

A transmission period and resources of a D2DSS/PD2DSCH for an ISS may be preconfigured or selected from a specific resource pool.

DSS_1 (Dependent Synchronization Source Type 1)

A DSS_1 is configured based on synchronization of a mother synchronization source (MSS). The MSS may be referred to as a synchronization reference. The MSS may be an ISS or another DSS. The DSS_1 may relay D2DSS timing, D2DSS sequence and PD2DSCH content of the MSS. Since an in_UE may transmit a D2DSS while synchronizing with an eNB, if the in_UE operates as a DSS_1, the eNB may operate as an MSS.

DSS_2 (Dependent Synchronization Source Type 2)

A DSS_2 is configured based on synchronization of an MSS and may replay D2DSS timing and sequence of the MSS. Unlike the DSS_1, assume that the DSS_2 does not relay content of a PD2DSCH. If an in_UE operates DSS_2, an eNB may operate as an MSS.

Hereinafter, if there is no special restriction on a DSS, the DSS is interpreted as including a DSS_1 and a DSS_2.

As described above, the ISS does not necessarily require a synchronization reference (e.g., MSS) but the DSS requires a synchronization reference. Accordingly, a process of determining whether to operate as an ISS or a DSS is related to a process of determining whether another synchronization source is selected as a synchronization reference. For example, a UE may operate as a DSS upon selecting another synchronization source (e.g., an eNB or a UE) as a synchronization reference and operate as an ISS upon not selecting another synchronization source as a synchronization reference. The UE may perform measurement of another synchronization source and determine whether the result of measurement satisfies a predetermined condition, as described below, in order to determine whether another synchronization source is selected as a synchronization reference.

II. D2DSS (D2D Synchronization Signal)

A D2DSS may include a primary D2DSS (PD2DSS) and a secondary D2DSS (SD2DSS). The term PD2DSS may be replaced with or used interchangeably with the term primary sidelink synchronization signal (PSSS) and the term SD2DSS may be replaced with or used interchangeably with the term secondary sidelink synchronization signal (SSSS).

D2D operation may be configured based on an LТЕ/LTE-A system and a PD2DSS and an SD2DSS may be generated based on the PSS/SSS of LTE/LTE-A. For example, the PD2DSS may have a similar/modified/repeated structure of a Zadoff-Chu sequence having a predetermined length or a PSS. The SD2DSS may have a similar/modified/repeated structure of an M-sequence or an SSS. More specifically, Equation 12 for generating a PSS sequence of LTE may be reused to generate the PD2DSS.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 12]}$$

In Equation 12, u denotes a root index of a Zadoff-Chu sequence. One of {25, 29, 34} is selected as the root index u of an LTE PSS and a physical cell ID $N_{ID}^{Cell}$ is generated based on the selected value. More specifically, the physical cell ID $N_{ID}^{Cell}=3N_{ID}^{(1)}+N_{ID}^{(2)}$. $N_{ID}^{(1)}$ is one of values of 0 to 167 derived from an SSS sequence and $N_{ID}^{(2)}$ is one of values of 0 to 2 derived from a PSS sequence. $N_{ID}^{(2)}=0, 1, 2$ correspond to root indices {25,29,34}, respectively.

The generated sequence of the LTE PSS is transmitted by an eNB on DL resources. However, since D2D communication is performed on UL resources, a PD2DSS is transmitted by a synchronization source on UL resources.

A D2DSS transmitted by a UE operating as a synchronization source includes the following two types:

D2DSSue_net: A set of D2DSS sequence(s) transmitted by a UE when the transmission timing reference is an eNB.

D2DSSue_oon: A set of D2DSS sequence(s) transmitted by a UE when the transmission timing reference is not an eNB.

Meanwhile, since the ISS is possible only in an out_UE, the ISS transmits one D2DSS of the D2DSSue_oon.

Since a DSS having an eNB as an MSS is an in_UE, the DSS transmits oneD2DSS of the D2DSSue_net.

A DSS having another UE as an MSS is an out_UE. If the MSS transmits the D2DSSue_oon, the DSS also transmits the D2DSSue_oon. If the MSS transmits the D2DSSue_net, the DSS may also relay the D2DSSue_net or transmit the D2DSSue_oon in order to reflect the network connection state thereof.

The D2DSSue_net may mean a D2DSS in network coverage and the D2DSSue_oon may mean a D2DSS out of network coverage. The D2DSSue_net and the D2DSSue_oon may be distinguished based on the root indices of the PD2DSS, which is the Zadoff-Chu sequence. For example, the root index of the PD2DSS for the D2DSSue_net may be configured differently with the root index of the PD2DSS for the D2DSSue_oon.

According to one embodiment of the present invention, the root index of the PD2DSS may be 26 or 37. In addition, within one subframe, two SC-FDMA symbols may be allocated to transmit the PD2DSS (Hereinafter, referred to as PD2DSS symbols). For example, SC-FDMA symbols corresponding to indices 1 and 2 may be PD2DSS symbols in the case of normal CP and SC-FDMA symbols corresponding to indices 0 and 1 may be PD2DSS symbols in the case of extended CP.

When two PD2DSS symbols are present in one subframe, whether PD2DSS sequences mapped to the two PD2DSS symbols are equally configured will be described.

According to one embodiment of the present invention, the PD2DSS sequences mapped to the two PD2DSS symbols may be equal to each other. In other words, a PD2DSS sequence generated based on any one of the root indices 26 and 37 may be repeatedly transmitted on the two PD2DSS symbols. At this time, the D2DSSue_net and the D2DSSue_oon may be distinguished through the root index.

For example, the root index 26 may correspond to the D2DSSue_net and the root index 37 may correspond to the D2DSSue_oon.

Meanwhile, a D2D UE for performing synchronization may have a frequency offset having a carrier frequency+/− 10 ppm as a maximum. In D2D operation, if a D2D Tx UE and a D2D Rx UE are considered, the range of the frequency offset which may occur in a D2D link may be −20 ppm to 20 ppm. On the assumption of the frequency offset of −20 ppm to 20 ppm, a large frequency offset of 50 kHz or more may occur in the case of Band 7 (UL: 2500 to 2570 MHz) specified as an E-UTRA operation band in RAN4.

Figure 9:
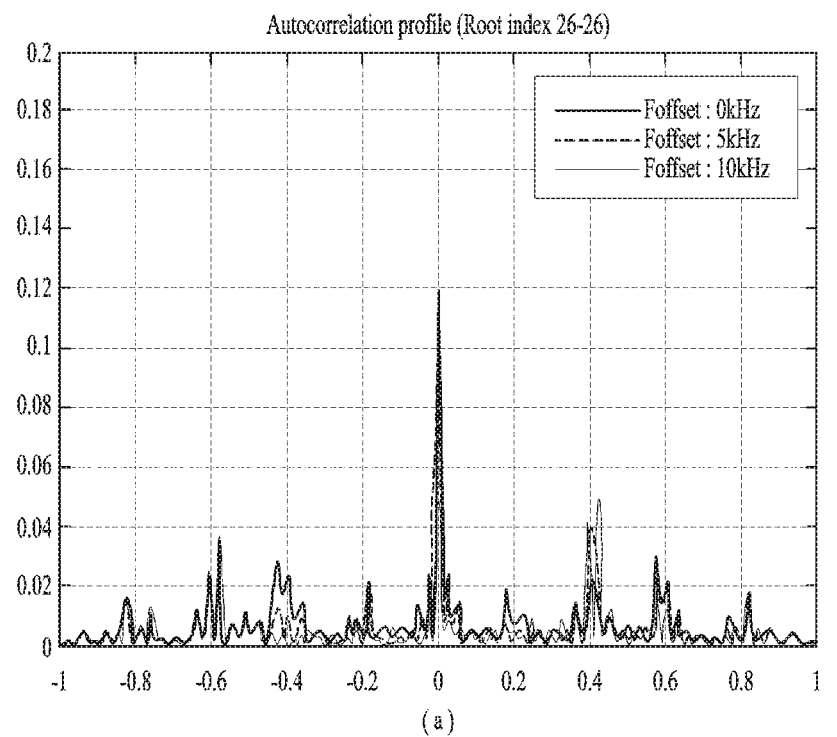
FIG. 9 is a diagram showing a result of simulating detection performance of a PD2DSS according to an embodiment of the present invention.
Figure 9:
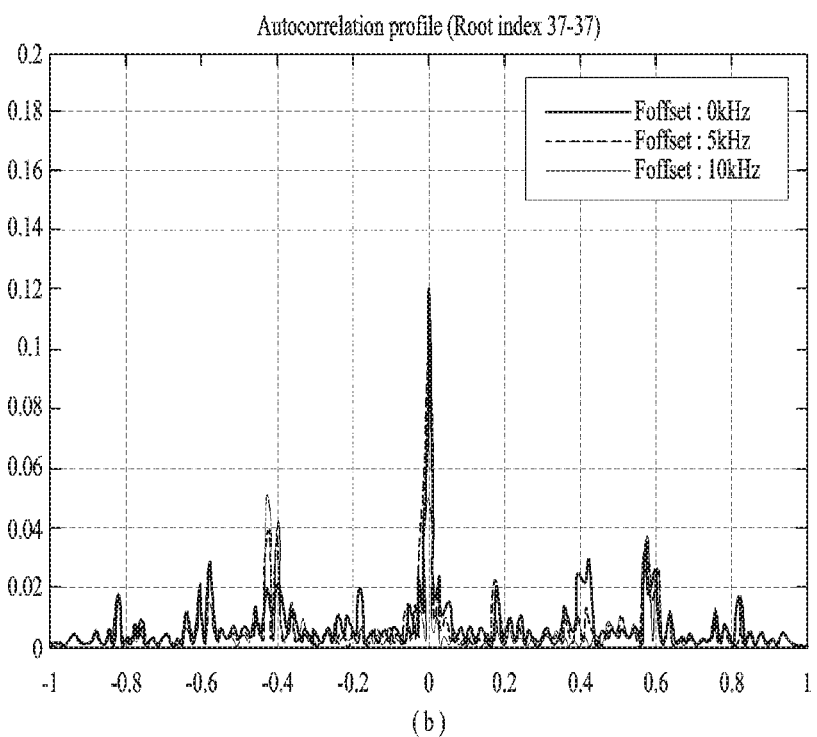

FIG. 9 is a diagram showing a result of simulating detection performance of a PD2DSS when the same PD2DSS generated by one root index is transmitted on two PD2DSS symbols. In FIG. 9, (a) shows the result of repeatedly using the root index 26 and (b) shows the result of repeatedly using the root index 37. Lines indicate different frequency offsets of 0 Hz, 5 Hz and 10 Hz.

As shown in FIG. 9, as the frequency offset increases, detection performance of the PD2DSS based on autocorrelation may deteriorate. In order to improve detection performance, a UE which will receive a PD2DSS may predict (pre-compensate for) a frequency offset and attempt detection. That is, the UE may apply a frequency offset having a predetermined value to a received signal and then perform autocorrelation. By such hypothetical detection, detection performance may be improved. However, since a UE attempts detection at each of the hypothesis levels of various frequency offsets, detection complexity may increase in proportion to the hypothesis level.

As one method of reducing the hypothesis level, PD2DSSs generated through different root indices may be mapped to PD2DSS symbols, respectively. In this case, as a combination of root indices, {26,37} or {37,26} may be used.

According to another embodiment of the present invention, the same PD2DSS sequence (e.g., the same root index) may be mapped to PD2DSS symbols in the case of in-coverage and different PD2DSS sequences may be mapped to the PD2DSS symbols in the case of out-of-coverage. Accordingly, the D2DSSue_net and the D2DSSue_oon may be distinguished depending on whether the PD2DSS sequences of the PD2DSS symbols are equal to each other.

III. PD2DSCH (Physical D2D Synchronization Channel)

A physical D2D synchronization channel (PD2DSCH) may be a broadcast channel, through which basic system information (e.g. D2D master information block, D2D MIB) that a D2D UE should know before D2D signal transmission and reception is transmitted. The term PD2DSCH may be replaced with the term physical sidelink broadcast channel (PSBCH). The PD2DSCH may be transmitted on the same subframe as a D2DSS.

The system information transmitted through the PD2DSCH may include, for example, at least one of the bandwidth for D2D communication, a D2D frame number, a D2D subframe number, UL-DL configuration information in the case of TDD, a CP length, information on a D2D subframe pattern (e.g., bitmap) and information on a D2D resource pool, without being limited thereto.

For demodulation of a PD2DSCH, a D2D demodulation RS (DMRS) may also be transmitted. The D2D DMRS may be generated based on some D2D specific parameters (group hopping, sequence hopping, orthogonal sequence, RS length, the number of layers, antenna ports, etc.) and may be generated using a method similar to that of a UL DMRS for a PUSCH.

In summary, the synchronization source may transmit a D2DSS (e.g., PD2DSS or S2D2SS), a PD2DSCH(e.g., system information) and a DMRS for PD2DSCH demodulation through one subframe, for D2D communication. In the subframe, two symbols may be allocated to the PD2DSS and two symbols may be allocated to the S2D2SS.

Meanwhile, if the synchronization source transmits a D2DSS for D2D discovery, a PD2DSCH (e.g., system information) and a DMRS for PD2DSCH demodulation may be omitted.

IV. Measurement for Selection of Synchronization Source Type

A method of determining the operation type of a UE as a synchronization source (e.g., ISS, DSS_1 and DSS_2) when the UE transmits or relays a D2DSS will be described.

According to one embodiment of the present invention, a UE may operate as a synchronization source type indicated by signaling from an eNB or a cluster header. A cluster or a synchronization cluster may be a group of D2D UEs for transmitting the same synchronization signal and the cluster header may be a D2D UE for providing a reference synchronization signal to a cluster. The eNB or the cluster header may indicate a reference node (e.g., an eNB or another UE) of the D2DSS and/or the PD2DSCH, upon signaling a DSS type to the UE.

According to another embodiment of the present invention, the UE may determine the synchronization source type thereof according to reception performance of a signal (e.g., a D2DSS, a PD2DSCH and a PD2DSCH DMRS) received from an eNB, a cluster header or another synchronization source. For example, the UE may determine whether the UE operates as an ISS (e.g., whether the UE transmits the D2DSS/PD2DSCH/PD2DSCH DMRS) or as a DSS (e.g., whether to depend on the received D2DSS/PD2DSCH/PD2DSCH DMRS) according to the result of measuring the signal received from the synchronization source. The synchronization source may be interpreted as being selected by the reception performance (or received power) of the received signal.

As a measurement metric of the synchronization source, (i) PD2DSCH BLER (Block Error Rate) or (ii) signal received power (hereinafter, referred to as SRP), e.g., received power of a D2DSS, received power of a PD2DSCH DMRS or received power of a PD2DSCH may be considered. At this time, the received power may be average power of a plurality of resources used for signal transmission. For example, average power of 6 RBs used for PD2DSCH DMRS transmission may be measured without being limited thereto. Hereinafter, embodiments according to measurement metric will be described in greater detail.

Embodiment of Measuring PD2DSCH BLER (Block Error Rate)

As described above, a D2DSS and a PD2DSCH may be multiplexed on the same subframe. For example, a PD2DSCH may be mapped to a symbol, to which a D2DSS is not mapped, of symbols of a PRB pair configuring a subframe. In some embodiments, the transmission periods of the PD2DSCH and the D2DSS may be differently set. In the present embodiment, as a method of measuring a synchronization source, the BLER of the PD2DSCH is considered.

When PD2DSCHs received on a plurality of subframes are statistically analyzed, the PD2DSCH BLER may be more accurately measured but a relatively long time is required therefor. Accordingly, instead of the method of measuring the PD2DSCH BLER in the plurality of subframes, a method of acquiring a measurement value capable of estimating the PD2DSCH BLER only in one or some subframes is proposed.

For example, a signal to interference plus noise ratio (SINR) capable of satisfying a target BLER is set as a target SINR. For convenience of description, an SINR will be described without being limited thereto. For example, a method of estimating a PD2DSCH BLER depending on whether a PD2DSCH is successfully decoded within a predetermined time or through an RSRP or an RSRQ may be used. Since a PD2DSCH DMRS is used to decode the PD2DSCH, successfully decoding the PD2DSCH may mean that content of the PD2DSCH is acquired through the PD2DSCH DMRS.

The UE measures the SINR of a known signal of the PD2DSCH and compares the measured value with a target SINR. At this time, the known signal may include at least one of a DMRS of a PD2DSCH, a PD2DSS and an SD2DSS. In another embodiment, the UE may measure the RSRP or RSRQ of the DMRS of the PD2DSCH and compare the measured value with a target value.

The UE may consider whether the PD2DSCH is detected (or received) within a predetermined time, upon measuring the PD2DSCH BLER. If the PD2DSCH is not detected within a predetermined time window (e.g., a value predetermined by higher layer signaling or standard), the UE may be defined to operate as an ISS. For example, the predetermined time may correspond to a subframe on which the D2DSS is transmitted. The UE may consider whether the PD2DSCH is detected within the same subframe as the subframe on which the D2DSS is transmitted. Detection of the PD2DSCH may mean that the PD2DSCH is successfully decoded. If the PD2DSCH is appropriately received and subjected to CRC check at a higher layer, the UE may regard the PD2DSCH as being detected.

The PD2DSCH BLER may be estimated through radio link monitoring (RLM) of the signal (e.g., D2DSS or PD2DSCH) of the synchronization source. For example, if decoding of the PD2DSCH fails for a predetermined time, the UE may determine that an appropriate synchronization source is not present or that a synchronization source is present but synchronization with the synchronization source cannot be maintained due to link instability, and perform selection of a synchronization source type. The RLM of the D2D link may be performed similarly to the RLM of a legacy eNB-UE link.

According to the present embodiment, in a radio channel environment having performance similar to that of a target BLER, it is possible to reduce a ping-pong phenomenon wherein the state of a UE is continuously switched to various states (e.g. ISS/DSS/No SS). For example, link quality Tout corresponding to 'PD2DSCH a % BLER (e.g. 10%)' and link quality Tin corresponding to 'PD2DSCH b % BLER (e.g. 2%)' are set with respect to the UE. If link quality lower than Tout is maintained for a predetermined time, the state of the UE may be switched (e.g., from the DSS to the ISS) and, if link quality corresponding to Tin is maintained for a predetermined time, the current state (e.g., DSS) may be maintained. The detailed operation of the present embodiment may be similar to the below-described RLF procedure. A threshold for the PD2DSCH BLER may be set for estimation using a single value and estimation of an RLM method.

Embodiment of Measuring SRP (Signal Received Power)

As described above, the UE may measure the received power of the D2DSS received from the synchronization source, the received power of the PD2DSCH or the received power of the PD2DSCH DMRS.

The received power of the D2DSS may be referred to as a synchronization signal received power (SSSR). The SSRP may include at least one of primary D2DSS received power (PSSRP), secondary D2DSS received power (SSSRP) and average D2DSS received power (ASSRP) or a combination thereof.

The PSSRP is the measurement result of the PD2DSS. If the number of root indices used for the PD2DSS is equal to or less than 3 and a plurality of synchronization sources is present near a UE, since the same PD2DSS sequence may be repeatedly received from the plurality of synchronization sources, accuracy may deteriorate in measurement of the PD2DSS of the individual synchronization source.

The SSSRP is the measurement result of the SD2DSS. When the SSSRP is measured, since a plurality of root indices is present, the problem of the PSSRP that the same sequence is repeatedly received can be solved. However, if power reduction is applied in order to reduce the peak to average power ratio (PAPR) of the M sequence, the received power value may be changed according to the value of the root index used for the SSSRP. In order to solve this problem, it is necessary to correct the reference value of the SSSRP per root index.

The ASSRP is the average of the measurements of the PD2DSS and the SD2DSS. Even when the ASSRP is used, similarly to the SSSRP, power reduction of the SD2DSS may be considered. For example, upon calculating the average, a weight applied to the SD2DSS may be changed according to the root index of the SD2DSS. Meanwhile, if a power ratio of the PD2DSS and the SD2DSS is given, the received power value measured with respect to the SD2DSS may be converted into the level of the PD2DSS and then the average may be calculated. If the average transmit powers of the PD2DSS and the SD2DSS are respectively 20 dBm and 10 dBm, the average power of the PD2DSS and the SD2DSS may be calculated by ½*(PD2DSS received power+ 2*SD2DSS received power).

Although the received power values of the PD2DSS and the SD2DSS are averaged in the above-described embodiment, the present invention is not limited thereto. For example, the average received power (or average RSRQ or average RSSI) of some or all of the PD2DSS, the SD2DSS and the PD2DSCH DMRS may be used. According to one embodiment, the average received power (RSRP) of the PD2DSCH DMRS may be used to select the synchronization source. The UE may average the received powers of the PD2DSCH DMRSs at the resources (e.g., 6 RBs), through which the PD2DSCH DMRSs are received.

In addition, according to another embodiment of the present invention, the SRP may be replaced with reference signal received quality (RSRQ) or may be used to calculate the RSRQ. For example, the UE may perform signal measurement through the D2DSS or PD2DSCH DMRS and perform total received signal measurement in the resource region in which the D2DSS and the PD2DSCH DMRS are transmitted, thereby acquiring RSRQ. Since interference may be applied to the RSRQ, it is possible to estimate actual link quality. If a received signal strength indicator (RSSI) including interference is measured in order to calculate the RSRQ, the UE may measure the RSSI only in the time/frequency resources in which the D2DSS and the PD2DSCH are transmitted, such that signals transmitted on other resources are not included in the RSSI.

In the embodiment of measuring the PD2DSCH BLER, a method of defining a target SINR capable of satisfying a target BLER and determining whether SINR requirements are satisfied through SINR measurement was proposed. Similar to this, a target value of a received power level of the PD2DSCH may be defined. Alternatively, a received power level capable of satisfying the target BLER may be set as a target PD2DSCH received power and a UE may compare the measured PD2DSCH received power with the target PD2DSCH received power.

The method of using the target PD2DSCH received power or the target SINR may be implemented in a simple manner as compared to the method of directly measuring the BLER. For example, if the target BLER is 1%, the UE may decode the subframes, on which at least 100 PD2DSCHs are transmitted, and determine whether the target BLER is satisfied based on the decoded result. In contrast, the method of using the target SINR or the target PD2DSCH received power may estimate the BLER using the average of the values measured in a relatively small number of subframes.

V. Selection of Synchronization Source Type Using Measurement Result

Each D2D UE may determine whether to operate as a synchronization source or the operation type of the UE as the synchronization source if the UE operates as the synchronization source, based on at least one of the above-described measurement results. Whether to operate as the synchronization source may be determined by received signal quality (e.g., signal received power (SRP)). If the UE operates as the synchronization source, the type (e.g., ISS, DSS) of the synchronization source may be determined by link quality (e.g., PD2DSCH BLER or PD2DSCH RLM).

In the below description, assume that the detailed values of the SRP threshold and the PD2DSCH BLER are predefined. For example, assume that distortion of the measured value due to SD2DSS power reduction is corrected. The eNB may signal information for determining the SRP threshold to the UE through higher layer signaling.

In the below description, the UE may be defined to operate as a DSS on the assumption of signaling from the synchronization source, e.g., signaling indicating that the synchronization signal of the synchronization source and/or the content of the PD2DSCH is relayed. For example, although the condition for operation as the DSS is satisfied, if signaling from the synchronization source is not performed, the UE may not operate as the DSS. Signaling from the synchronization source may be used to prevent more UEs than necessary from operating as the DSS. For convenience of description, although the SRP is focused upon, the SRP may be replaced with one of the above-described metrics (e.g., RSRP, RSRQ, PD2DSCH BLER, etc.).

Embodiment of Using SRP Condition

According to one embodiment of the present invention, the UE may use only the SRP condition.

The D2D UE compares the received power of the measured signal with the SRP threshold. If the received power of the measured signal does not satisfy the SRP threshold or if a signal is not detected, the UE may operate as a synchronization source (e.g., ISS). In contrast, if the received power of the measured signal satisfies the SRP threshold, the UE may not operate as an ISS. If the UE does not operate as the ISS, the UE may transmit the D2DSS and/or the PD2DSCH of the synchronization source at timing determined based on the D2DSS timing (e.g., subframe) of the synchronization source.

Meanwhile, if only the SRP threshold is considered, the procedure of the UE may be simplified. However, whether the PD2DSCH is successfully decoded needs to be considered in terms of efficiency of UE operation and system performance and clarity of procedure. For example, if the SRP value is low but interference and noise are relatively low or if the SRP value is high but interference and noise are relatively high, it may be difficult to define UE operation using only the SRP. The received power of the measured signal may be greater than the SRP threshold but the PD2DSCH may not be received (e.g., decoding of the PD2DSCH fails), or the received power may be less than the SRP threshold but the PD2DSCH may be decoded.

Accordingly, according to one embodiment of the present invention, only the SRP measured when the PD2DSCH is successfully decoded may be regarded as being valid, which will be described in greater detail below.

As an example of the present invention, if one SRP threshold (e.g., threshold=A) is defined, the UE measures a signal received from a synchronization source synchronizing therewith and compares the received power value (e.g., SRP=X) of the measured signal with the SRP threshold. If the received power value of the signal does not satisfy the SRP threshold (e.g., X<A), the UE operates as an ISS. If the received power value of the signal satisfies the SRP threshold, the UE may not operate as an ISS/DSS (e.g., according to signaling of the synchronization source) or may operate as a DSS.

As another embodiment, each UE may report the result of measuring the signal to the synchronization source. The report may include information indicating whether another out_UE is present. For example, if the received power value of the signal does not satisfy the SRP threshold (e.g., X<A), the UE may omit the report and may operate as an ISS. If the received power value of the signal satisfies the SRP threshold (e.g., X>A), the UE may report the measurement result and information indicating whether another out_UE is present to the synchronization source and receive information indicating whether the UE operates as a DSS from the synchronization source. This is commonly applicable to the embodiments in which the UE operates as a DSS.

In the above-described embodiments, the signal, the received power of which is measured, is not limited to the D2DSS and may be a PD2DSCH DMRS. Measurement of the received power of the PD2DSCH DMRS may be used in an environment in which a D2D discovery signal and a D2D communication signal coexist. In a current D2D system, UEs which perform only a D2D discovery procedure (e.g., UEs in network coverage) may transmit only the D2DSS but may not transmit the PD2DSCH. In addition, the transmission period of the D2DSS transmitted for the purpose of D2D discovery may be longer than that of the D2DSS transmitted for the purpose of D2D communication. While any one UE transmits a D2DSS for the purpose of D2D discovery, another UE may transmit a D2DSS for the purpose of D2D communication (e.g., located at the same subframe). In a state in which the D2DSS for discovery and the D2DSS for D2D communication overlap, the result of measuring the resource region in which the D2DSS signal is transmitted (e.g., the measurement result in the transmission period of the discovery signal) may be relatively greater than the result of measuring the resource region in which the PD2DSCH is transmitted. Since the overlapping D2DSSs are measured, measurement accuracy may be reduced or the measurement result fluctuating according to the measurement time may be obtained.

Accordingly, the UE (e.g., out_UE) may perform measurement of the signal (e.g., the PD2DSCH or PD2DSCH DMRS) transmitted in the resource region of the PD2DSCH except for the D2DSS in a process of determining whether the UE operates as the synchronization source.

In another embodiment, the UE may calculate the average of the measurements of the signal (e.g., PD2DSS/SD2DSS) transmitted in the D2DSS region and the signal (e.g., DMRS) transmitted in the PD2DSCH region and use the average to determine whether the UE operates as the synchronization source. If the average is calculated, the measurement result may fluctuate depending on whether a discovery signal is received, but the fluctuation level may be reduced.

Replacing the result of measuring the D2DSS with the result of measuring the PD2DSCH DMRS is applicable to the embodiments of measuring the D2DSS.

Embodiment of Using PD2DSCH Quality Condition

According to another embodiment, a UE may determine whether to operate a synchronization source through a PD2DSCH quality threshold. For example, if a PD2DSCH block error rate (BLER) threshold is satisfied, a D2D UE may not operate as a synchronization source and, if a PD2DSCH BLER threshold is not satisfied, a D2D UE may operate as an ISS.

Meanwhile, even in this case, if the PD2DSCH BLER threshold is not satisfied but the received power value of a signal is high, an exceptional operation of a UE may be defined. For example, although the PD2DSCH BLER condition is not satisfied, if reception of a D2DSS is possible, a UE may operate as a DSS_2.

The PD2DSCH BLER may be replaced with RSRP, RSRQ, etc. of a reference signal used for PD2DSCH demodulation (e.g. DMRS, SD2DSS).

As another method of using the PD2DSCH BLER, a UE may perform link monitoring with respect to a PD2DSCH and determine whether to operate as a synchronization source according to the result of determining whether a link has failed. For example, the UE measures the SINR of a PD2DSCH DMRS. As the measurement result, if SINR measurement which does not satisfy PD2DSCH demodulation requirements appears several times, the UE may determine that the link has failed and then operate as an ISS. The UE may configure and use two PD2DSCH BLERs (or SINRs corresponding thereto) as conditions for operation as an ISS and a DSS. However, operation of the DSS may be performed according to signaling from the synchronization source. Such a method is commonly applicable to the embodiments of using the PD2DSCH BLER.

Embodiment of Using Single SRP Condition & PD2DSCH Quality Condition

According to an embodiment of the present invention, an SRP condition (e.g., SRP threshold) and a PD2DSCH quality condition (e.g., PD2DSCH BLER threshold) are defined. For example, operation of a UE for combinations of determinations as to whether the SRP threshold and the PD2DSCH BLER threshold are satisfied may be defined as follows:

(i) If the SRP threshold is satisfied and the PD2DSCH BLER threshold is not satisfied, the UE may not operate as a synchronization source or may operate as a DSS_2. Operation of the DSS_2 may be performed by signaling from an eNB or a cluster header.

(ii) If the SRP threshold is satisfied and the PD2DSCH BLER threshold is not satisfied, the UE may not operate as a synchronization source or may operate as a DSS_1 or DSS_2 according to signaling from an eNB or a cluster header.

(iii) If the SRP threshold is not satisfied and the PD2DSCH BLER threshold is not satisfied, the UE operates as an ISS.

(iv) If the SRP threshold is not satisfied and the PD2DSCH BLER threshold is satisfied, the UE does not operate as a synchronization source. However, the UE may operate as a DSS_1 or DSS_2 according to signaling from an eNB or a cluster header.

According to another embodiment of the present invention, a first threshold may be set to an SRP threshold (e.g., the RSRP of the D2DSS and/or the PD2DSCH DMRS) and the second threshold may be set to a signal quality threshold (e.g., the RSRQ of the D2DSS and/or the demodulation quality or RSRQ of the PD2DSCH), without being limited thereto. For example, the UE performs signal strength measurement of a D2DSS (e.g., PD2DSS and/or SD2DSS) (e.g., RSRP and RSRQ) and measurement of demodulation performance metric of a PD2DSCH (e.g. PD2DSCH BLER and SINR). The threshold of each metric may be signaled from a synchronization source or may be predefined. Operation of a UE for combinations of determinations as to whether the thresholds are satisfied is as follows:

(i) If the SRP threshold is satisfied and the PD2DSCH quality threshold is satisfied, the UE does not operate as a synchronization source.

(ii) If the SRP threshold is satisfied and the PD2DSCH quality threshold is not satisfied, the UE operates as a DSS_2 (e.g., according to signaling from a synchronization source) or operates as an ISS.

(iii) If the SRP threshold is not satisfied and the PD2DSCH quality threshold is satisfied, the UE may operate as a DSS (e.g., according to signaling from a synchronization source).

(iv) If the SRP threshold is not satisfied and the PD2DSCH quality threshold is not satisfied, the UE may operate as an ISS.

Embodiment of Using Plural SRP Conditions & PD2DSCH Quality Condition

In the embodiment of using the single SRP condition and PD2DSCH quality condition, since decoding of the PD2DSCH should be attempted regardless of whether the SRP condition is satisfied, complexity of PD2DSCH decoding may increase.

In order to reduce a burden due to PD2DSCH decoding, according to an embodiment of the present invention, a plurality of SRP quality conditions (e.g., SRP thresholds) and one PD2DSCH quality condition (e.g., a PD2DSCH BLER threshold) may be set with respect to a UE. For example, the plurality of SRP thresholds may include an SRP high limit TH_high and an SRP low limit TH_low. TH_low may mean a threshold for enabling the UE to operate as an ISS and TH_high may mean a threshold for enabling the UE to operate as a DSS. If the plurality of SRP thresholds is used, operation of the UE may be defined as follows:

(i) If SRP measurement value <TH_low, the UE operates as an ISS (PD2DSCH decoding is not necessary).

(ii) If TH_low <SRP measurement value <TH_high & PD2DSCH BLER threshold is not satisfied, the UE may operate as a DSS_2.

(iii) If TH_low <SRP measurement value <TH_high & PD2DSCH BLER threshold is satisfied, the UE may operate as a DSS_1.

According to another embodiment, only two SRP thresholds may be used to determine whether the UE operates as a synchronization source. For example, (i) If SRP measurement value <TH_low, the UE operates as an ISS.

(ii) If TH_low <SRP measurement value <TH_high, the UE may operate as a DSS (e.g., according to signaling from a synchronization source)

(iii) If SRP measurement value >Th_high, the UE may not operate as a synchronization source.

For in_UE and out_UE

The above-described embodiments of IV and V are applicable to an out_UE and an in_UE. If the embodiments are applied to an in_UE, a signal format for an in-network may be used. For example, an SRP may be measurement of a PSS/SSS and/or CRS transmitted by an eNB and PD2DSCH link monitoring may be replaced with link monitoring of a PDCCH transmitted by the eNB.

In an embodiment related to operation based on a PD2DSCH BLER threshold, an in_UE may determine whether to operate as a synchronization source based on a PDCCH BLER threshold. For example, the in_UE may determine whether to operate as a synchronization source through a radio link monitoring (RLM) process based on a PDCCH BLER. The in_UE reports an 'out-of-sync' indicator to a higher layer if link quality which does not satisfy PDCCH BLER 10%. The higher layer operates a timer (e.g., T310 timer) when the 'out-of-sync' indicator is continuously reported predetermined times (e.g., 'N310' times). Thereafter, if link quality corresponding to PDCCH BLER 2% or less is measured, the in_UE reports an 'in-sync' indicator to the higher layer. The higher layer stops the timer (e.g., T310 timer) if the indicator is continuously reported predetermined times (e.g., 'N311' times). If the timer expires, the in_UE declares link failure (RLF). Before the timer expires, since the in_UE is regarded as being connected to a network, the in_UE operates a DSS having an eNB as an MSS. If RLF occurs while the in_UE operates as the DSS and transmits D2DSSue_net, the UE may not have the eNB as the MSS. Accordingly, if the UE does not have another UE as the MSS after RLF occurs, the UE may operate as an ISS and transmit D2DSSue_oon.

Meanwhile, if the in_UE is regarded as being connected to the network, the in_UE performs D2D operation using a D2D resource pool configured by the network. For example, in a period in which the timers 'T311' and 'T301' operate, the in_UE may use a mode 2 resource pool configured by the network. On the assumption that the in_UE which uses the resource pool configured by the network is still located in network coverage, the in_UE may operate as a DSS having an eNB as an MSS and transmit D2DSSue_net. The above-described timers T311 and T301 are related to an RRC connection re-establishment procedure or a cell reselection procedure (see 3GPP TS 36.331).

In one embodiment, if the in_UE detects presence of an out_UE in a state of being connected to the network, a request/notification for operation as a DSS may be transmitted to the network.

The request/notification for operation as the DSS is applicable to an out_UE belonging to a synchronization cluster. For example, the synchronization cluster may mean a UE set which includes an existing cellular cell and transmits the same D2DSS or maintains the same synchronization. If the result of measurement performed by the out_UE belonging to the synchronization cluster satisfies both or some of the SRP and PD2DSCH and a UE which does not belong to the synchronization cluster is present, the out_UE belonging to the synchronization cluster may report/request operation as the DSS to/from the synchronization source of the synchronization cluster. A message for reporting/requesting operation as the DSS may include the ID of the detected UE. The synchronization source of the synchronization cluster may whether a relay UE for the detected UE is already present in the synchronization cluster to accept or reject the request/report for operation as the DSS.

Measurement Validity

In the above-described embodiments, as a criterion for determining that a time when the UE performs signal measurement is valid or determining that signal measurement performed by the UE is valid, decoding of a predetermined channel transmitted on the same subframe as a signal to be measured may be considered. For example, if a predetermined channel (e.g., PD2DSCH or discovery data) transmitted when measurement of a PD2DSS, an SD2DSS, a PD2DSCH DMRS or a discovery signal DMRS (e.g. RSRP, RSRQ, SINR, etc.) is performed is successfully decoded (e.g., if CRC check of a lower layer is successful and thus a higher layer may acquire the information element of a PD2DSCH), the UE may determine that measurement of the PD2DSS, the SD2DSS, the PD2DSCH DMRS or the discovery signal is valid. For example, the UE may use only the measurement result of the subframe, the PD2DSCH on which is successfully decoded, (i.e., valid measurement result) among measurements performed within a predetermined time. The measurement results may be averaged.

For example, valid RSRP measurement of the PD2DSCH DMRS may mean that the PD2DSCH associated with the PD2DSCH DMRS is decoded through the PD2DSCH DMRS to acquire the information element of the PD2DSCH. If the measurement result of the RSRP of the PD2DSCH DMRS satisfies a threshold or the information element of the PD2DSCH associated with the PD2DSCH DMRS satisfying the threshold may be acquired, the UE may select a synchronization source, which has transmitted the PD2DSCH DMRS and the PD2DSCH, as a synchronization reference and operate as a DSS.

If the measurement result does not satisfy the threshold, as described in the above-described embodiments, the UE may operate as a synchronization source (e.g., ISS). As another method, if PD2DSCH decoding has failed for a predetermined time or predetermined times, this may mean that a D2D link has failed. Alternatively, the two methods may be combined such that the UE operates as a synchronization source if the measurement result is equal to or less than a predetermined level or if PD2DSCH decoding (e.g., continuously) has failed for a predetermined time or predetermined times.

Stepwise Determination of Synchronization Source Operation

A method of determining synchronization source operation may be performed stepwise.

(i) Process of Determining Whether Signal is Successfully Detected

The UE estimates link quality through measurement of a received synchronization signal or a region in which a synchronization signal may be transmitted and determine whether the synchronization signal has been detected. For example, the RSRQ and SINR (e.g., average RSRQ and SINR) of the resources in which the synchronization source is transmitted may be considered as an index for determining whether the PD2DSCH is successfully decoded or as an evaluation index of a PD2DSCH BLER. Alternatively, the UE may determine whether decoding is successful by performing decoding of the PD2DSCH. The UE may determine that detection of the synchronization signal has failed if the measurement result does not satisfy the threshold. The UE may operate as an ISS if detection of the synchronization signal has failed for a predetermined period or predetermined times (e.g., detection of the synchronization signal continuously fails).

Accordingly, the process (i) may be responsible for determining whether the UE operates as an ISS in synchronization source operation. The threshold for the process (i) may be predefined (e.g. PD2DSCH BLER, SINR/RSRQ/RSRP of the synchronization signal or SINR/RSRQ/RSRP of the DMRS) or may be delivered to the UE through higher layer signaling.

(ii) Process of Determining Synchronization Source Operation Using Strength of Synchronization Signal The process (ii) is applicable to a synchronization signal satisfying the reference of the process (i), that is, a successfully detected synchronization signal. The UE may determine whether the UE operates as a synchronization source based on the strength or RSRP of the detected synchronization signal. For example, if the RSRP of the detected synchronization signal satisfies a threshold, the UE may not operate as a synchronization source. In contrast, if the RSRP of the synchronization signal does not satisfy the threshold, the UE may operate as a DSS through the decoded PD2DSCH and the sequence of the detected synchronization signal.

According to an embodiment, the UE may unconditionally operate as a DSS if the RSRP of the synchronization signal satisfies the threshold. According to another embodiment, the UE may operate as a DSS according to signaling from the eNB or the cluster header. The UE may transmit the measurement result or information indicating that the condition for operation as a DSS is satisfied to the eNB or the cluster header, for signaling from the eNB or the cluster header.

D2D Communication Method According to Embodiments of the Present Invention

Figure 10:
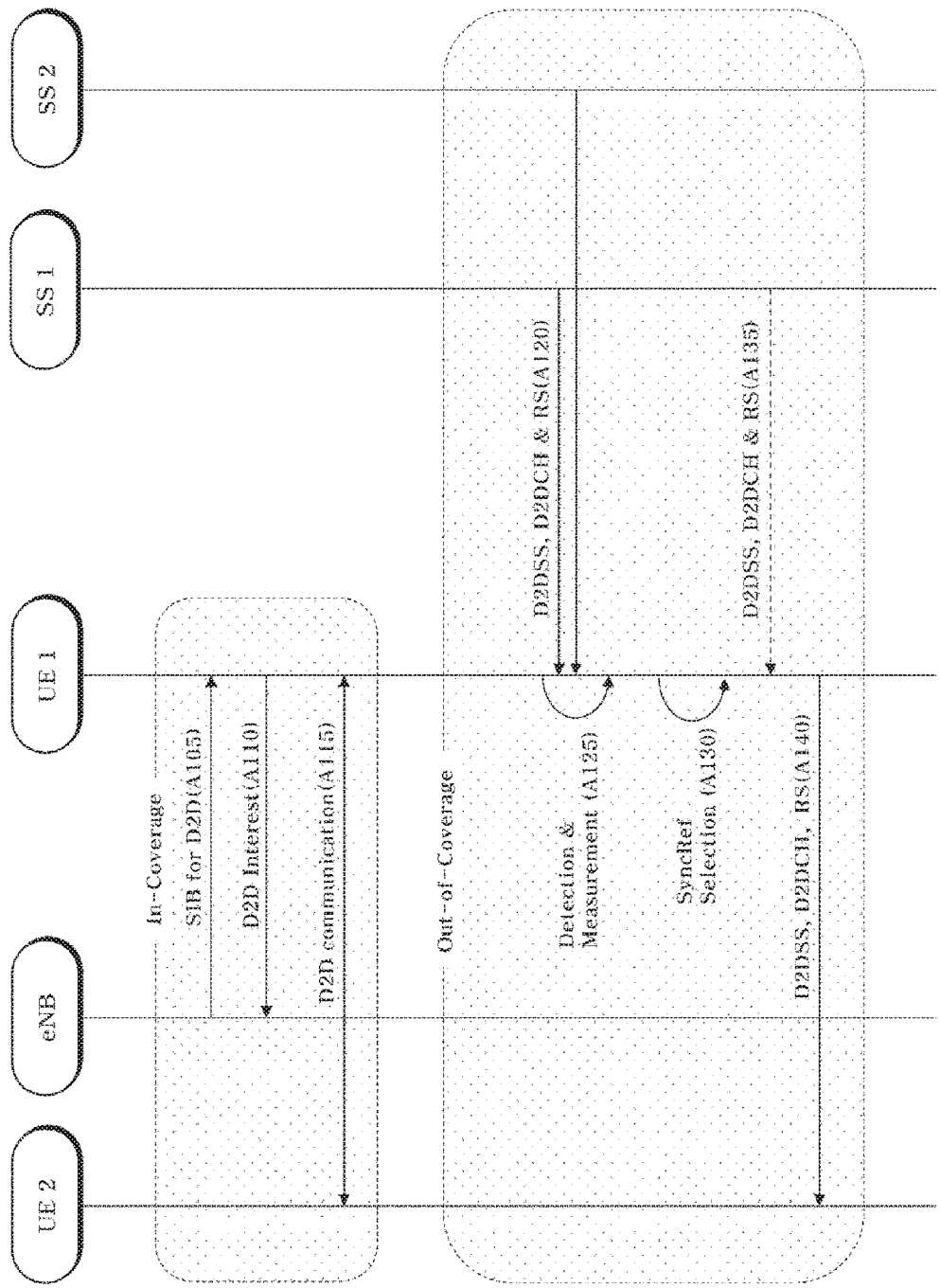
FIG. 10 is a diagram illustrating D2D communication according to an embodiment of the present invention.

FIG. 10 is a diagram illustrating a D2D communication method according to an embodiment of the present invention. Overlapping details will be omitted from the description.

Referring to FIG. 10, the shown D2D communication process includes an in-coverage procedure and an out-of-coverage procedure of a first UE.

First, the first UE acquires system information for D2D communication from an eNB (A105). The system information may be broadcast by the eNB. System information block (SIB) 18 and SIB 19 may include system information for D2D communication. The system information may include information on a resource pool for D2D communication and predetermined parameters.

The first UE transmits information indicating an interest in D2D communication to the eNB (A110).

When the UE is in coverage, the first UE performs D2D communication with a second UE based on signaling from the eNB and predetermined parameters (A115). A process of performing D2D communication may include at least one of transmission and reception of a D2DSS, transmission and reception of a PD2DSCH, transmission and reception of a PD2DSCH DMRS, transmission and reception of a D2D data channel and transmission and reception of a D2D control channel.

Thereafter, assume that the first UE has moved out of coverage. Assume that a process of, at the first UE, selecting a synchronization reference UE is performed only when the UE is out of coverage UE. In other words, if the UE is in coverage, since D2D communication is performed based on signaling and setting of the eNB, the synchronization reference UE may be required only when the UE is out of coverage.

A first synchronization source and a second synchronization source transmit D2DSSs, respectively (A120). A subframe on which the D2DSS is transmitted may include a D2D channel and/or a D2D reference signal. At this time, the D2D channel is a channel for broadcasting D2D system information and may be a PD2DSCH, for example. The system information transmitted through the D2D channel may include at least one of the bandwidth for D2D communication through a D2D channel, a D2D frame number, a D2D subframe number and uplink (UL)-downlink (DL) configuration information in the case of a time division duplex (TDD), without being limited thereto. The D2D reference signal may be a DMRS for demodulation of a D2D channel.

The first UE may detect the D2DSSs of the first synchronization source and the second synchronization source and measure a D2D reference signal (A125). The D2DSS may include a PD2DSS and an SD2DSS. The first UE may detect the sequence of the PD2DSS repeatedly mapped to at least two symbols based on any one of a plurality of root indices for a Zadoff-Chu sequence. At this time, a first root index of the plurality of root indices may correspond to in-coverage and a second root index may correspond to out-of-coverage.

Measurement of the D2D reference signal may be measurement of an average of received powers of resources on which a D2D demodulation reference signal (DMRS) for demodulation of a D2D channel is transmitted.

If a predetermined condition is satisfied, the first UE selects a synchronization reference UE from between the first synchronization source and the second synchronization source (A130). If the result of measuring the D2D reference signal satisfies a threshold and an information element of a D2D channel associated with the D2D reference signal satisfying the threshold is acquired, the predetermined condition may be satisfied.

For example, if the RSRP of the PD2DSCH DMRS exceeds the threshold and the PD2DSCH is successfully decoded through the PD2DSCH DMRS to receive the information element of the PD2DSCH, the predetermined condition is satisfied. In contrast, if the RSRP of the PD2DSCH DMRS does not satisfy the threshold or if decoding of the PD2DSCH has failed, the synchronization reference UE is not selected. If the synchronization reference UE is selected, the first UE may perform D2D communication based on the timing of the synchronization reference UE (e.g., operate as a DSS) and, if the synchronization reference UE is not selected, the first UE may perform D2D communication at the timing of the first UE itself (e.g., operate as an ISS).

For convenience of description, assume that the D2D channels and the D2D reference signals of the first synchronization source and the second synchronization source satisfy the predetermined condition and the measurement value of the RSRP for the D2D reference signal of the first synchronization source is greater than that of the RSRP for the second synchronization source. Accordingly, assume that the first UE selects the first synchronization source as a synchronization reference UE.

The first synchronization source may periodically transmit the D2DSS, the D2D channel and/or the D2D reference signal (A135).

The first UE may configure, to the first UE itself, the information element of the D2D channel received from the first synchronization source which is the synchronization reference source, for D2D communication.

The first UE may transmit at least one of a D2DSS of the first UE and an information element of a D2D channel of the first UE, at least part of the D2DSS of the first UE being configured the same as the D2DSS received from the first synchronization source, and at least part of the information element of the D2D channel of the first UE being configured the same as the information element of the D2D channel received from the first synchronization source which is the synchronization reference UE (A140). For example, the ID of the D2DSS transmitted by the first UE may be configured the same as the ID of the D2DSS of the first synchronization source which is the synchronization reference UE.

If the predetermined condition is not satisfied and thus the synchronization reference UE is not selected and the first UE is out of coverage, the first UE may select the ID of the D2DSS and transmit the generated D2DSS through the ID of the selected D2DSS (e.g., operate as an ISS). At this time, resources preconfigured by the eNB may be used for transmission of the D2DSS.

Figure 11:
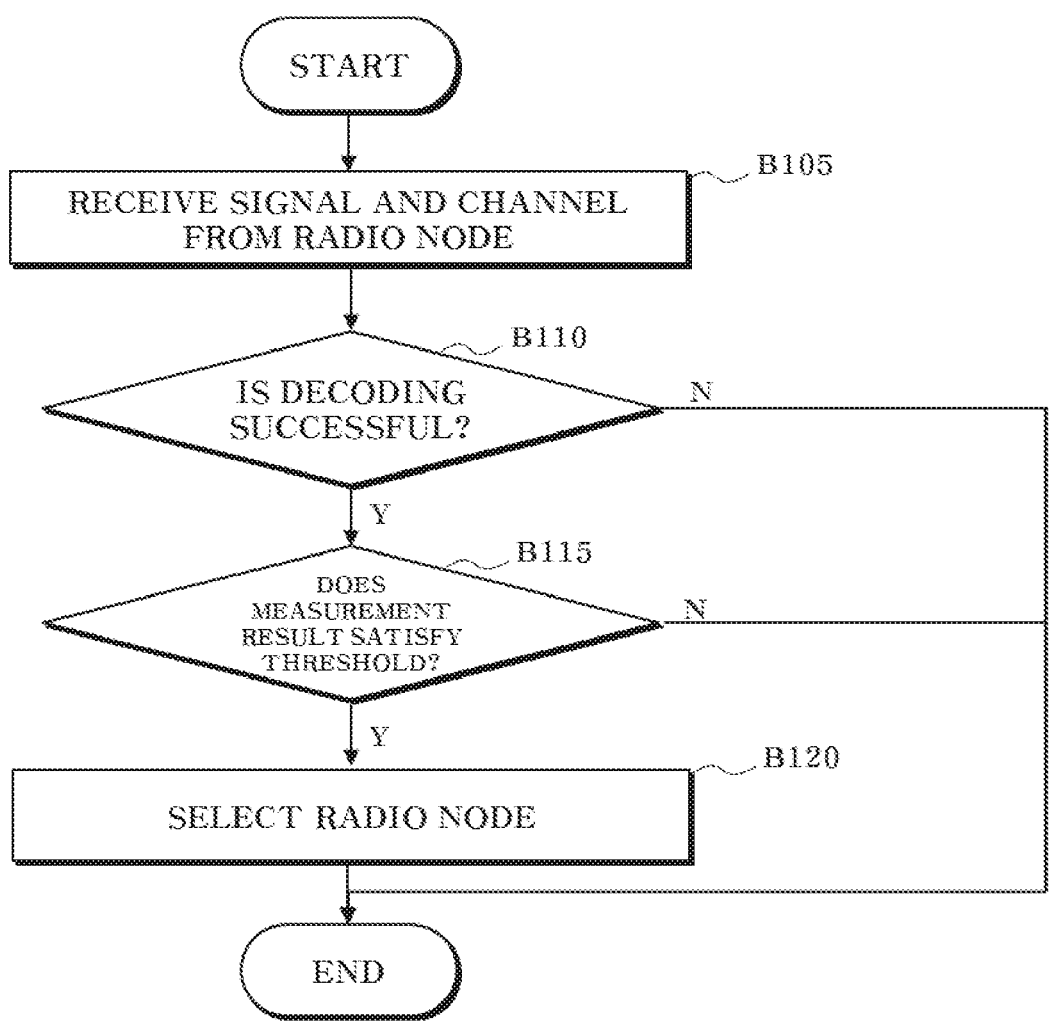
FIG. 11 is a diagram illustrating a method of, at a D2D UE, selecting a predetermined node according to an embodiment of the present invention.

FIG. 11 is a diagram illustrating a method of, at a D2D UE, selecting a predetermined node according to an embodiment of the present invention. Overlapping details will be omitted from the description.

In the present embodiment, a method of, at a UE, selecting an arbitrary radio node will be described. The UE may support D2D communication and a radio node may be a node supporting relaying (e.g., another D2D UE) or the above-described synchronization reference UE, without being limited thereto.

First, the UE receives a signal and a channel from the radio node through the same subframe (B105). The UE measures the received signal. The signal may be the above-described D2DSS, DMRS or discovery signal, without being limited thereto.

According to an embodiment of the present invention, if the radio node supports relaying, the discovery signal may include information on a relaying node. The UE may measure a DMRS for demodulating the discovery signal to measure the radio node (e.g., the relaying node). Measurement of the DMRS of the discovery signal may be valid when the discovery signal is successfully decoded as described below. Meanwhile, a discovery procedure of transmitting a discovery signal and a synchronization procedure of transmitting a synchronization signal are generally independently performed. Accordingly, after the synchronization procedure is performed, the discovery procedure is performed. Exceptionally, for example, if the relaying node is a synchronization source, the synchronization procedure and the discovery procedure may be simultaneously performed.

According to an embodiment of the present invention, decoding of the channel transmitted through the same subframe as the measured signal should succeed in order to make the measurement of the UE valid. For example, if the information element of the channel is acquired as decoding of the channel is successful, signal measurement may be regarded as being valid.

Accordingly, the UE attempts to decode the channel transmitted through the same subframe as the measured signal (B110) and determines that the result of measuring the signal satisfies a threshold if decoding is successful (B115). If decoding has failed, the signal measurement is ignored and a radio node, which has transmitted the signal and the channel, is not selected.

If the result of measuring the signal satisfies the threshold, the radio node is selected (B120). If the radio node is a UE supporting relaying, the UE performs communication through the radio node. In contrast, if the radio node is a synchronization reference of D2D communication, the UE performs D2D communication based on the radio node.

Configuration of Apparatus According to Embodiments of the Present Invention

Figure 12:
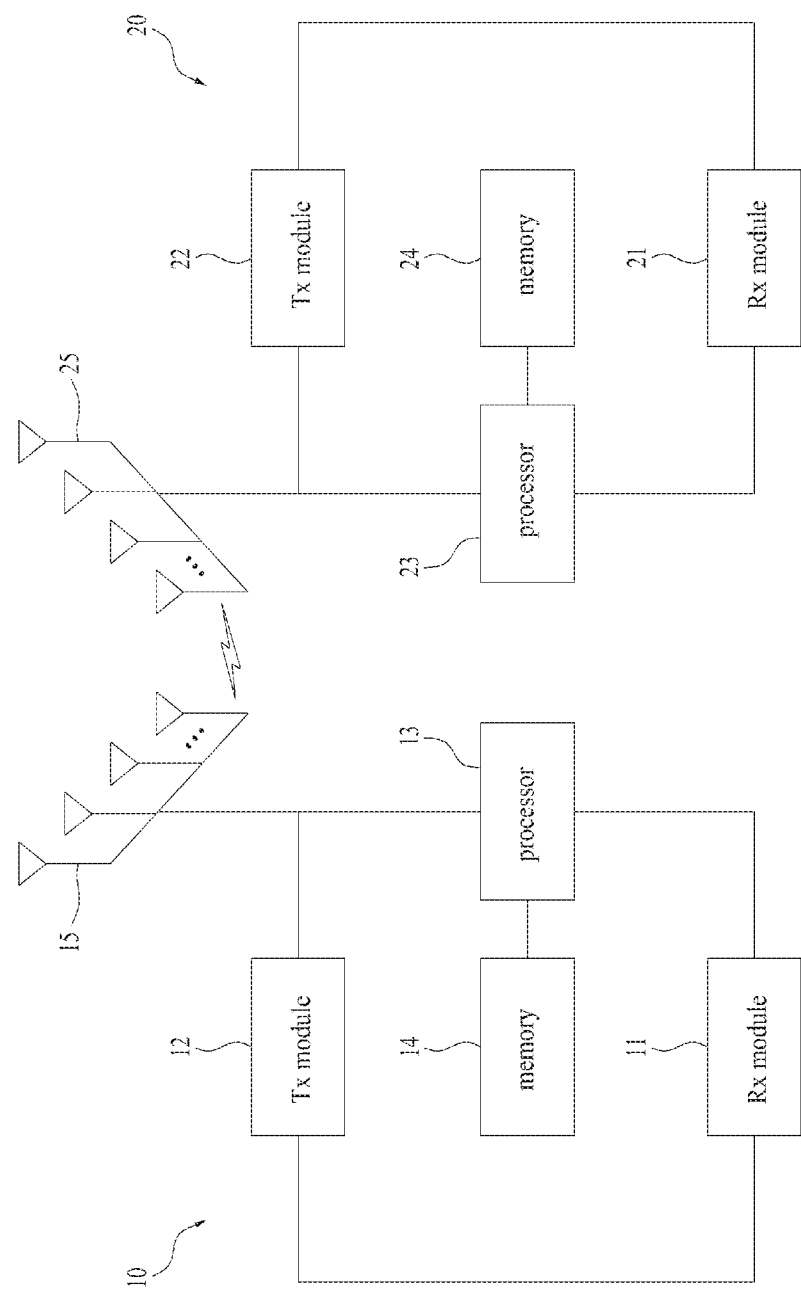
FIG. 12 is a diagram showing the configuration of a transmission and reception apparatus according to an embodiment of the present invention.

FIG. 12 is a diagram showing a transmission point apparatus and a reception point apparatus according to an embodiment of the present invention. The shown transmission point device and reception point device may perform the methods of the above-described embodiments and overlapping details will be omitted from the description.

The transmission point apparatus or the reception point apparatus may operate as an eNB, a relay, a D2D UE, a D2D synchronization source or a D2D synchronization reference UE, without being limited thereto.

Referring to FIG. 12, the transmission point apparatus 10 according to the embodiment of the present invention may include a receiver 11, a transmitter 12, a processor 13, a memory 14 and a plurality of antennas 15. Since the plurality of antennas 15 is used, the transmission point apparatus may support MIMO transmission/reception. The receiver 11 may receive a variety of signals, data and information from the UE in uplink. The transmitter 12 may transmit a variety of signals, data and information to the UE in downlink. The processor 13 may control the overall operation of the transmission point apparatus 10.

The processor 13 of the transmission point apparatus 10 according to the embodiment of the present invention may process operations necessary for the embodiments.

The processor 13 of the transmission point apparatus 10 may process information received by the transmission point apparatus 10 and information to be transmitted to an external device and the memory 14 may store the processed information for a predetermined time and may be replaced by a component such as a buffer (not shown).

Referring to FIG. 12, the UE apparatus 20 according to the present invention may include a receiver 21, a transmitter 22, a processor 23, a memory 24 and a plurality of antennas 25. Since the plurality of antennas 25 is used, the UE apparatus may support MIMO transmission/reception. The receiver 25 may receive a variety of signals, data and information from the eNB in downlink. The transmitter 22 may transmit a variety of signals, data and information to the eNB in uplink. The processor 23 may control the overall operation of the UE apparatus 20.

The processor 23 of the UE apparatus 20 according to the embodiment of the present invention may process operations necessary for the embodiments.

The processor 23 of the UE apparatus 20 may process information received by the UE apparatus 20 and information to be transmitted to an external device and the memory 24 may store the processed information for a predetermined time and may be replaced by a component such as a buffer (not shown).

According to the embodiment of the present invention, if the reception point apparatus 20 operates as a D2D UE, the receiver 21 receives a D2D synchronization signal from at least one synchronization source. The processor 23 measures a D2D reference signal received through the same subframe in which the D2D synchronization signal is received. The processor 23 selects a synchronization reference UE from at least one synchronization source depending on whether a predetermined condition is satisfied. If the result of measuring the D2D reference signal satisfies a threshold and an information element of a D2D channel associated with the D2D reference signal satisfying the threshold is acquired, the predetermined condition may be satisfied. The processor 23 may measure an average of received powers of a plurality of resources, on which a D2D DMRS for demodulation of the D2D channel is transmitted. The transmitter 22 may transmit at least one of a D2DSS of the D2D UE 20 and an information element of a D2D channel of the D2D UE 20, at least part of the D2DSS of the D2D UE 20 being configured the same as the D2DSS received from the synchronization reference UE, and at least part of the information element of the D2D channel of the D2D UE 20 being configured the same as the information element of the D2D channel received from the synchronization reference UE. If the predetermined condition is not satisfied and thus the synchronization reference UE is not selected, the D2D UE 20 may perform D2D communication at the timing thereof. If the predetermined condition is satisfied and thus the synchronization reference UE is selected, the D2D UE 20 may perform D2D communication based on the timing of the selected synchronization reference UE. If predetermined condition is not satisfied and thus the synchronization reference UE is not selected and the D2D UE 20 is out of coverage, the D2D UE 20 may transmit the D2D synchronization signal thereof based on the pre-configuration of the eNB. When the D2D UE 20 is changed from out-of-coverage to in-coverage, the D2D UE 20 may perform D2D communication based on signaling of the eNB.

In the above-described detailed configuration of the transmission point apparatus and the UE apparatus, details of the above-described various embodiments of the present invention may be independently applied or 2 or more embodiments may be applied at the same time. In this case, overlapping details will be omitted from the description for simplicity and clarity.

Furthermore, in the description of FIG. 12, the description of the transmission point apparatus 10 may also be equally applied to a device functioning as a downlink transmitter or an uplink receiver. The description of the UE apparatus 20 may also be equally applied to a relay station device functioning as an uplink transmitter or a downlink receiver.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method of performing device-to-device (D2D) communication by a user equipment (UE) in a wireless communication system, the method comprising:
   detecting a D2D synchronization signal which is transmitted from at least one synchronization source;
   measuring a D2D demodulation reference signal (DMRS) for a D2D channel, wherein the D2D DMRS and the D2D channel are received through a same subframe in which the D2D synchronization signal is detected; and
   selecting a synchronization reference UE from the at least one synchronization source depending on whether a predetermined condition is satisfied,
   wherein the predetermined condition is satisfied when a result of measuring the D2D DMRS satisfies a threshold and is valid, and
   wherein the result of measuring the D2D DMRS is determined to be valid when the UE succeeds in obtaining an information element of the D2D channel, and the result of measuring the D2D DMRS is determined to be invalid when the UE fails to obtain the information element of the D2D channel.

2. The method according to claim 1, wherein measuring the D2D DMRS includes measuring an average of received powers of resources, on which the D2D DMRS is received.

3. The method according to claim 1, further comprising:
   transmitting at least one of a D2D synchronization signal of the UE or an information element of a D2D channel of the UE, at least part of the D2D synchronization signal of the UE being configured the same as the D2D synchronization signal received from the synchronization reference UE, and at least part of the information element of the D2D channel of the UE being configured the same as the information element of the D2D channel received from the synchronization reference UE.

4. The method according to claim 1, wherein when the predetermined condition is not satisfied and the synchronization reference UE is not selected, the UE performs the D2D communication at a timing of the UE itself, and wherein when the predetermined condition is satisfied and the synchronization reference UE is selected, the UE performs the D2D communication based on a timing of the selected synchronization reference UE.

5. The method according to claim 1, further comprising:
transmitting, by the UE, a D2D synchronization signal of the UE itself based on a pre-configuration of a base station, when the predetermined condition is not satisfied, the synchronization reference UE is not selected and the UE is out of coverage.

6. The method according to claim 1, wherein the UE performs the D2D communication based on signaling from a base station when the UE is changed from out-of-coverage to in-coverage.

7. The method according to claim 1, wherein detecting the D2D synchronization signal includes:
detecting a sequence of a primary D2D synchronization signal (PD2DSS) which is repeatedly mapped to at least two symbols based on one of a plurality of root indices for a Zadoff-Chu sequence.

8. The method according to claim 7, wherein a first root index of the plurality of root indices corresponds to in-coverage and a second root index of the plurality of root indices corresponds to out-of-coverage.

9. The method according to claim 1, wherein the information element of the D2D channel includes a bandwidth for D2D communication broadcasted through the D2D channel, a D2D frame number, a D2D subframe number and uplink (UL)-downlink (DL) configuration information in a case of time division duplex (TDD).

10. A user equipment (UE) for performing device-to-device (D2D) communication, the UE comprising:
a receiver configured to receive a D2D synchronization signal which is transmitted from at least one synchronization source; and
a processor configured to:
measure a D2D demodulation reference signal (DMRS) for a D2D channel, wherein the D2D DMRS and the D2D channel are received through a same subframe in which the D2D synchronization signal is received, and
select a synchronization reference UE from the at least one synchronization source depending on whether a predetermined condition is satisfied,
wherein the predetermined condition is satisfied when a result of measuring the D2D DMRS satisfies a threshold and is valid, and
wherein the result of measuring the D2D DMRS is determined to be valid when the processor succeeds in obtaining an information element of the D2D channel, and the result of measuring the D2D DMRS is determined to be invalid when the processor fails to obtain the information element of the D2D channel.

11. The UE according to claim 10, wherein the processor signal measures an average of received powers of resources, on which the D2D DMRS is received.

12. The UE according to claim 10, further comprising:
a transmitter configured to transmit at least one of a D2D synchronization signal of the UE or an information element of a D2D channel of the UE, at least part of the D2D synchronization signal of the UE being configured the same as the D2D synchronization signal received from the synchronization reference UE, and at least part of the information element of the D2D channel of the UE being configured the same as the information element of the D2D channel received from the synchronization reference UE.

13. The UE according to claim 10, wherein when the predetermined condition is not satisfied and the synchronization reference UE is not selected, the UE performs the D2D communication at a timing of the UE itself, and wherein when the predetermined condition is satisfied and the synchronization reference UE is selected, the UE performs the D2D communication based on a timing of the selected synchronization reference UE.

14. The UE according to claim 10, further comprising:
a transmitter configured to transmit a D2D synchronization signal of the UE itself based on a pre-configuration of a base station, when the predetermined condition is not satisfied, the synchronization reference UE is not selected and the UE is out of coverage.

15. The UE according to claim 10, wherein the UE performs the D2D communication based on signaling from a base station when the UE is changed from out-of-coverage to in-coverage.

* * * * *